US011003796B2

(12) United States Patent
Tucker et al.

(10) Patent No.: US 11,003,796 B2
(45) Date of Patent: May 11, 2021

(54) ARTIFICIAL INTELLIGENCE BASED DOCUMENT PROCESSOR

(71) Applicant: ACCENTURE GLOBAL SOLUTIONS LIMITED, Dublin (IE)

(72) Inventors: Piper Frances Tucker, Chicago, IL (US); Travis Bowers, Cambridge, MA (US); James Robert Priestas, Arlington, VA (US); Tara Lynn O'Gara, Chicago, IL (US); Sarat Gurram, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 147 days.

(21) Appl. No.: 16/531,848

(22) Filed: Aug. 5, 2019

(65) Prior Publication Data

US 2019/0354720 A1    Nov. 21, 2019

Related U.S. Application Data

(63) Continuation-in-part of application No. 16/179,448, filed on Nov. 2, 2018, now Pat. No. 10,796,080, which is a continuation-in-part of application No. 15/922,567, filed on Mar. 15, 2018, now Pat. No. (Continued)

(51) Int. Cl.
*G06F 40/279* (2020.01)
*G06F 21/62* (2013.01)
*G06N 3/08* (2006.01)
*G06F 40/295* (2020.01)

(52) U.S. Cl.
CPC ........ *G06F 21/6254* (2013.01); *G06F 40/295* (2020.01); *G06N 3/08* (2013.01)

(58) Field of Classification Search
CPC ............. G06F 21/6245; G06F 21/6254; G06F 40/279; G06F 40/284
See application file for complete search history.

(56) References Cited

U.S. PATENT DOCUMENTS

| 6,014,680 A | 1/2000 | Sato et al. |
| 6,778,979 B2 | 8/2004 | Grefenstette et al. |
| 7,117,432 B1 | 10/2006 | Shanahan et al. |

(Continued)

FOREIGN PATENT DOCUMENTS

| CA | 2831300 | 3/2012 |
| EP | 2343670 | 7/2011 |

(Continued)

*Primary Examiner* — Daniel Abebe
(74) *Attorney, Agent, or Firm* — Mannava & Kang, P.C.

(57) ABSTRACT

An Artificial Intelligence (AI) based document processing system receives a request including one or more documents related to a process to be automatically executed. The information including the fields and an intent required for the process are extracted from one or more of the request and the documents. The required documents and fields are selected based on the intent and a domain model. The required fields are validated using external knowledge and the discrepancies identified therein are resolved. An internal master document is built based on the required fields. The internal master document is employed for the automatic execution of the process which can include a de-identification process or an appeal process.

20 Claims, 28 Drawing Sheets

Related U.S. Application Data 10,489,502, which is a continuation-in-part of application No. 15/879,031, filed on Jan. 24, 2018.

(60) Provisional application No. 62/674,367, filed on May 21, 2018, provisional application No. 62/527,441, filed on Jun. 30, 2017.

(56) References Cited

U.S. PATENT DOCUMENTS

| | | |
|---|---|---|
| 8,429,179 B1 | 4/2013 | Mirhaji |
| 9,734,289 B2 | 8/2017 | Pecora |
| 2002/0103834 A1 | 8/2002 | Thompson et al. |
| 2003/0061201 A1 | 3/2003 | Grefenstette et al. |
| 2005/0108001 A1 | 5/2005 | Aarskog |
| 2006/0020466 A1 | 1/2006 | Cousineau et al. |
| 2006/0104511 A1 | 5/2006 | Guo et al. |
| 2007/0279672 A1* | 12/2007 | Harada ............ H04N 1/44 358/1.14 |
| 2009/0012842 A1 | 1/2009 | Srinivasan et al. |
| 2009/0070295 A1* | 3/2009 | Otomori ............ G06F 16/88 |
| 2010/0174732 A1 | 7/2010 | Levy et al. |
| 2010/0293451 A1 | 11/2010 | Carus |
| 2015/0286842 A1* | 10/2015 | Mori ............ G06F 16/23 726/30 |
| 2015/0317613 A1* | 11/2015 | Clark ............ G06Q 20/4014 705/44 |
| 2016/0203336 A1* | 7/2016 | Nambiar ............ G06F 21/6245 726/26 |
| 2017/0236154 A1 | 8/2017 | Purves |
| 2018/0046764 A1 | 2/2018 | Katwala et al. |
| 2019/0019022 A1 | 1/2019 | Marda et al. |
| 2019/0005012 A1 | 3/2019 | Priestas |
| 2019/0156060 A1* | 5/2019 | Maier ............ G06F 21/6254 |
| 2019/0213354 A1* | 7/2019 | Bhowan ............ G06F 40/30 |
| 2019/0236102 A1 | 8/2019 | Wade et al. |
| 2019/0272384 A1* | 9/2019 | Kawabata ............ H04W 12/02 |

FOREIGN PATENT DOCUMENTS

| | | |
|---|---|---|
| EP | 3422202 | 1/2019 |
| JP | 2005-050245 | 2/2005 |
| JP | 2006-079189 | 3/2006 |
| JP | 2009-223662 | 10/2009 |
| JP | 2010-140457 | 6/2010 |
| JP | 2015-143906 | 8/2015 |
| WO | 02/056196 | 7/2002 |
| WO | 2009/006609 | 1/2009 |
| WO | 2017/139499 | 8/2017 |

* cited by examiner

| # | Type | Input | Process | Output | Example |
|---|---|---|---|---|---|
| 1 | | Text value | Directly pass to output | Same text value | Accenture |
| 2 | | Text value | Regex validation | Same text value or value in an updated format | e.g., date, account number |
| 3 | Controlled | Single value from a set | Validation against a pre-defined set of values | Same value or resolution is required (if value doesn't match the allowed set) | US States |
| 4 | | Values from a set that combine to create a unique value | Validation against a pre-defined set of values and also cross validation of values | Same value or resolution is required (if value doesn't match the allowed set) | Some benefits may be per month while others must be per annum |
| 5 | | Phrase | Validation against a pre-defined set of values | Same value or resolution is required (if value doesn't match the allowed set) | Some of the in/out of network comments we see could be pre-defined. |
| 6 | | Presence of a piece of text | Derive Yes/No<br>Derive a different value<br>Copy the provided value | Yes/No<br>Included/Excluded, Controlled set (e.g., a % or $ amount) | Lifestyle Management Programs: Stress Management, Tobacco Cessation and Weight Management - the presence of these programs indicates their inclusion in the plan |
| 7 | Freetext | Semantic check of the meaning of text | Derive Yes/No<br>Derive a different value<br>Copy the provided value | Yes/No<br>Included/Excluded, Controlled set (e.g., a % or $ amount) | Subject to Penalty [...] 50% penalty applied to hospital inpatient charges for failure to contact Cigna Healthcare |
| 8 | ??? | | Derived, copied, or a summary | Large section of text | |

500

502 — Input
504 — Process
506 — Output
508 — Example

FIG.5

| # | Comparison Type | Example |
|---|---|---|
| 1 | Direct/Identical match | Accenture v Accenture |
| 2 | Identical match minus punctuation and cases | Accenture v accenture |
| 3 | Set comparison | State comparison |
| 4 | Range comparison | 0-100% |
| 5 | Fuzzy match | John H. Smith v John Smith |
| 6 | Synonyms | Hearing aid v Hearing device |
| 7 | Abbreviations | Rehab. v Rehabilitation |
| 8 | Presence of terms (substring match) | Both Opposite and Same Sex Domestic Partners v Domestic Partners |
| 9 | Comparison of derived values | 50% penalty applied v Penalty Percent |

FIG. 19

Supporting Medical Policies and Requirements:

> [P1] 43842 - Gastric restrictive procedure, without gastric bypass, for morbid obesity; vertical-banded gastroplasty Medically unnecessary-failure to meet policy ▼

> [MP1] Bariatric Surgery and Other
> Treatments for Clinically Severe Obesity ✱
> All Diagnoses Codes > 1. Is the procedure being considered gastric bypass and gastric restrictive procedures with a Roux-en-Y procedure up to 150 cm, laparoscopic adjustable gastric banding (for example, the Lap-Band System for the REALIZE Adjustable Gastric Band), vertical banded gastroplasty, biliopancreatic bypass with duodenal switch, and sleeve gastrectomy (open or laparoscopic) for an individual with clinically severe obesity and is 18 years or older?   Y N
>    ◉ ○

Evidence:
   Select evidence type from annotation panel to add evidence

> 1.1 Does the individual have a BMI of 40 or greater, or BMI of 35 or greater   ◉ ○

> 1.2 The physician requesting authorization for the surgery must provided the following documentation:

---

2404

> MEMBER DETAILS    Eligible
> PROVIDER DETAILS
> Releasing Provider Details   Gold Card & PAR Gold Card Status ✓   [PAR]

| Provider Name: | Carrie Johnson | PROVIDER NPI: | 2375908164 |
| Speciality: | Primary Care Physician | PROVIDER ID: | 82194627 |

> Servicing Provider Details   Gold Card & PAR   [RESET]
> FACILITY DETAILS   Gold Card & PAR
> PROVIDER DETAILS
> Referring Provider Details   Gold Card & PAR
> Servicing Provider Details   Gold Card & PAR Gold Card Status ✓   [PAR]

| Provider Name: | Alexandra Hawkins | PROVIDER NPI: | |
| Speciality: | Bariatric Surgeon | PROVIDER ID: | 3320917 |

[RESET]

---

2406

> AUTHORIZATION DETAILS   Information Present
> Non-Clinical Authorization Summary Type of Service
OUTPATIENT ▼

Place of Service
11 - Office ▼

◉ DOS Start  05/03/2017  ◉ DOS End  05/09/2017
Highlighted text: 05/03/2017   Highlighted text: 05/09/2017

◉ Urgency Status:
Not Urgent ▼
Highlighted text: Do not use this

Procedure codes:

[P1] 43842 - Gastric restrictive procedure without gastric bypass, for morbid obesity, vertical banded gastroplasty
Highlighted text: Gastric Bypass Surgery ✱ 43842 ✱

Diagnosis:

[D1] E66.01 - Morbid (severe) obesity due to excess calories
Highlighted text: Severe Obesity ✱ E66.01 ✱

[D2] Z68.41 - Body mass index (BMI) 40.0-44.9 adult
Highlighted text: 268.41 ✱

Includes Clinical Information ○

2410

ARTIFICIAL INTELLIGENCE BASED DOCUMENT PROCESSOR

PRIORITY

This application is a continuation-in part of the U.S. Non-provisional application Ser. No. 16/179,448 filed on Nov. 2, 2018, which in turn claims priority to U.S. Provisional patent application No. 62/674,367, filed on May 21, 2018. The U.S. Non-provisional application Ser. No. 16/179,448 is also a continuation-in-part of U.S. Non-provisional application Ser. No. 15/922,567, which was filed on Mar. 15, 2018, which is a continuation-in-part of U.S. Non-provisional application Ser. No. 15/879,031 filed on Jan. 24, 2018, which in turn claims priority to U.S. provisional application Ser. No. 62/527,441, filed on Jun. 30, 2017, the disclosures of these applications are expressly incorporated herein by reference in their entireties.

BACKGROUND

Forms or documents of various types are widely used for collecting information for various purposes. Medical, commercial, educational and governmental organizations use documents of various formats for collecting information and for record keeping purposes. The advent of computers and communication networks resulted in the documents being moved online so that people no longer have to fill out forms on paper. In addition, digitized records, including electronic and scanned copies of paper documents, are now generated using computers. These electronic documents are shared over the communication networks thereby saving time and resources that may be otherwise required for generating and exchanging paper documents.

These documents may contain data in structured and unstructured formats. A structured document can have embedded code which enables arranging the information in a specified format. Unstructured documents include free form arrangements, wherein the structure, style and content of information in the original documents may not be preserved. It is not uncommon for record-keeping entities to create and store large unstructured electronic documents that may include content from multiple sources.

Often, various enterprise systems wish to utilize information from electronic documents to perform operations. It is relatively easy to programmatically extract information from structured documents that have a well-defined or organized data model, such as extracting data from fields in a form where the fields are at a known location in the form (e.g., data in a tabular arrangement). However, when the electronic documents include large unstructured documents, such as the type of unstructured document discussed above, it is technically difficult to extract information that may be needed to perform operations of enterprise systems or other types of systems. Unstructured documents often do not have well-defined data models, making it difficult to reliably programmatically parse and extract the needed information from the documents.

BRIEF DESCRIPTION OF DRAWINGS

Features of the present disclosure are illustrated by way of examples shown in the following figures. In the following figures, like numerals indicate like elements, in which:

FIG. 5 shows a tabular form of example validations associated with various fields extracted during the document processing in accordance with the examples disclosed herein.

FIG. 6 shows a tabular form of example matches that can occur between various values.

FIG. 15 shows a graphical user interface (GUI) that enables user editing of the information extracted from a request in accordance with the examples disclosed herein.

FIG. 16 shows a GUI including various user edits that are enabled by the document processing system in accordance with the examples disclosed herein.

FIG. 17 shows a GUI including an EHR of a patient that is displayed by the document processing system in accordance with the examples disclosed herein.

FIG. 18 shows a GUI with a portion of the EHR that is displayed when an 'H' tab corresponding to the medical history is selected in accordance with the examples disclosed herein.

FIG. 19 shows a GUI that enables a user to sign off on a portion of the EHR such as in accordance with the examples disclosed herein.

FIG. 20A shows a GUI including a de-identification review screen that enables anonymizing or pseudonymizing a member's details in accordance with the examples disclosed herein.

FIG. 20B shows a GUI including details of fields to be anonymized or pseudonymized in accordance with the examples disclosed herein.

FIG. 21A shows a GUI including a review screen for automatically analyzing and validating a provider's appeal in accordance with the examples disclosed herein.

FIG. 21B shows a claim history extracted in accordance with the examples disclosed herein.

FIG. 21C shows request details extracted in accordance with the examples disclosed herein.

FIG. 22 shows an enrollment user interface generated in accordance with the examples disclosed herein.

FIG. 23 shows a user interface pertaining to the evaluation of a healthcare plan under HEDIS in accordance with the examples disclosed herein.

FIG. 24 shows user interfaces pertaining to the utilization management processes in accordance with the examples disclosed herein.

DETAILED DESCRIPTION

Figure 1:
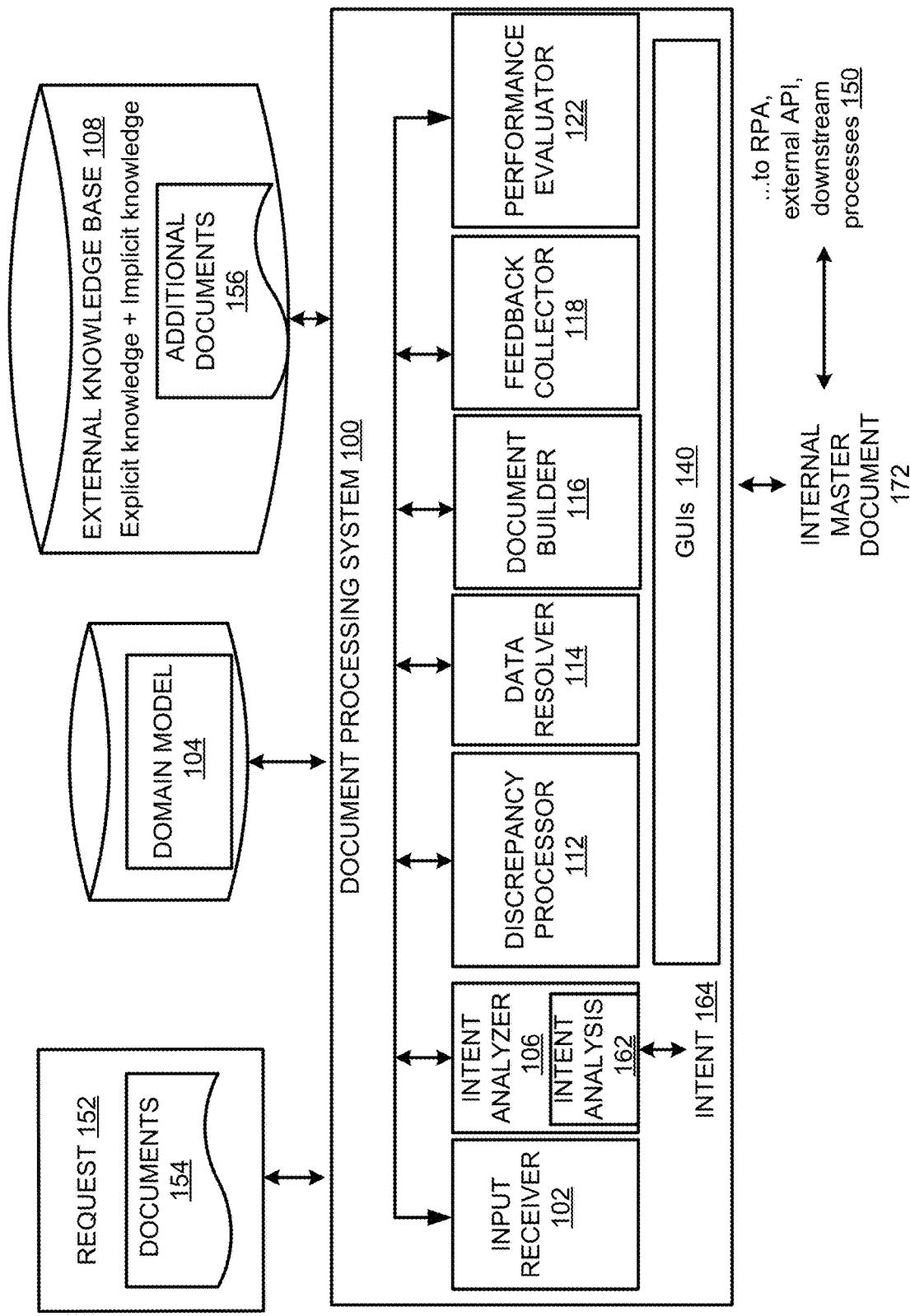
FIG. 1 shows a block diagram of an Artificial Intelligence (AI)-based document processing system in accordance with the examples disclosed herein.

For simplicity and illustrative purposes, the present disclosure is described by referring mainly to examples thereof. In the following description, numerous specific details are set forth to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a document processing system is described which processes electronic documents such as, but not limited to, structured and unstructured documents to extract required information and enable automatic execution of processes based on the extracted information. The extracted information can be used to build internal master documents which further enable generating forms, contracts and the like during the automatic execution of the processes. The document processing system can also be configured for discrepancy resolution so that any discrepancies identified during the document processing can be automatically resolved based on various information sources available to the document processing system. If the document processing system fails to automatically resolve the discrepancy then such fields can be flagged for human review.

The document processing system employs a machine learning (ML) based domain model which can include domain-specific terminology, definitions of industry terms including the possible fields of various data types that may be included in the documents received for processing at the document processing system. Accordingly, automatic execution of processes from various domains that require the identification of specific key-value pairs within a document (e.g., insurance, customer care, banking, telecoms, etc.) is enabled based on the particular domain model employed by the document processing system. An intent is identified by the document processing system from a request that can include one or more documents. The intent can be an identifier or other indicator of an automatically executed process that the document processing system enables in response to receiving the request. The intent can be further processed via employing the domain model and one or more other data sources including external knowledge bases. Based on the identified intent, a document may be processed via one or more different process streams. Accordingly, different input fields may be extracted and identified using the domain model and different internal master documents can be built based on a selected process stream. Correspondingly, the discrepancy resolutions and the user interfaces (UIs) employed to present the information from the document processing system may also differ based on the process streams.

Technical improvements of the document processing system include inter alia effectively converting documents of different formats into homogenous documents via optical character recognition (OCR), improving the precision of the desired information that is extracted and compared from the documents, automatic resolution of discrepancies using AI techniques and automatic execution of the downstream processes via building the internal master documents. The documents processed may further contain one or more of structured and unstructured component documents of different formats some of which may include typed textual data while others may include handwritten text and some of the data may be presented as tables, graphs or other non-textual formats. The document processing system can analyze such heterogeneous documents having a range of varying formats to identify, and compare information presented therein. The data transformations from other formats to textual data types using optical character recognition (OCR) and/or AI techniques represent technical improvements as they allow not only dynamic presentation of the data from non-editable image files but also enable robotic process automation (RPA) via building internal master documents from the extracted/processed data. Automating downstream processes improve the speed and accuracy of not only the document processing system (which may implement such automated processes) but also other external computing systems which are now able to consume data directly as homogenous internal master documents as opposed to extracting data from non-homogenous data sources such as the documents of different data formats that may have been initially received by the document processing system. The techniques discussed herein are applicable irrespective of the systems currently employed to execute the automated processes. The document processing system can be designed to be legacy system agnostic and provides for automation and AI support by leveraging data that is already being passed between workflow processes which implies minimal or no requirements for legacy system integration.

FIG. 1 shows a block diagram of an AI-based document processing system 100 in accordance with an example. The document processing system 100 receives electronic documents in structured or unstructured formats either as machine-readable files or as image files and processes the electronic documents to identify or interpret an intent 164 conveyed in one or more of the electronic documents. The documents are processed based on the intent 164 to generate one or more internal master documents that can be further employed in downstream processes within the document processing system 100 or other external systems 150.

The document processing system 100 includes an input receiver 102 that receives a request 152 for automatic execution of one or more processes. The request 152 can be received in different modalities including by not limited to communication channels such as emails or as input from other systems via direct file transfers and the like. The request 152 which pertains to a particular automated process can be received at a particular component of a network. For example, if the request 152 pertains to claims processing request, then the email including the request 152 can be received at a claims inbox thereby indicating that an automated claims process is to be initiated in response to the request 152. The request 152 can further include information such as electronic documents 154 necessary for the document processing system 100 to identify the process to be automatically executed. The request 152 when received in an email may include the additional documents 154 as attachments to be processed for extracting the information necessary for the intent identification.

Various processes and data will be described herein in terms of examples pertaining to the healthcare domain but it can be appreciated that the examples are only given by way of illustration. The document processing system 100 can be therefore be similarly configured to automate processes within various domains based at least on implementation of different domain models in accordance with examples disclosed herein. Some example downstream processes that are automated using the document processing system 100 can include, but are not limited to, risk adjustment, utilization management, intelligent benefits, member enrollment, provider data management, provider credentialing, Protected Health Information (PHI) de-identification, provider appeals and the like which can include automated data identification, categorization, interpretation, analysis to generate recommendations. Each of these processes will be discussed as examples herein below in order to illustrate the technical advantages afforded by the document processing system 100. Each process can employ a version of the domain model 104 that is customized to that particular process. The customization of the domain model 104 can encompass inclusion of domain-specific information such as the various parameters, hyper-parameters, name-value pairs and the like the details of which will be discussed herein.

One such example process discussed is intelligent benefits. Each year when millions of workers apply for renewing their health insurance and pharmacy benefits, the bulk of the requests come at particular times of the year, for example, from September through December. However, prior to being able to handle the renewal requests or other changes, the computing systems associated with the insurance processes need to be updated. Benefits evolve annually based on various conditions such as healthcare delivery costs, drug prices, compliance with federal or state insurance regulations and the like. Accordingly, the computing systems handling insurance processes may require that benefits structures be created or rebuilt and updated to reflect changes in coverage, costs, persons covered, regulations and the like. The United States has approximately 1.5 million individual providers (primary care physicians, specialists, nurse practitioners, dentists, social workers, etc.) and 6000+ facilities that must provide demographic and license information to each healthcare plan they are contracted with in order to be reimbursed for claims. Today, no industry mandated, standard, transaction format exists for this data resulting in very manual, labour-intensive processes that are time-consuming and error prone as millions of structured and unstructured documents are to be reviewed each year for the procedures. Each update for a single renewal transaction can take 4-24 hours with additional time for resolving discrepancies as the computing systems are not configured to handle discrepancies. For example, a transaction may require review and comparison of over 1,000 fields within the benefits structures for the updates. Some transactions can require review, interpretation and validation of more than 10 forms which can include documents as varied as, electronic health records (EHRs), receipts, licenses, medical degrees, specialization certificates and the like.

The information required to identify the intent of a given document and execute an automatic process can include various fields that are extracted in terms of name-value pairs from the request 152. In an example, a domain model 104 which includes the various definitions of relevant domain terms can supply the names for the values extracted from the request 152. The domain model 104 enables implementing an intelligent, automatic approach to identifying relevant key-value pairs from the request 152. In an example, the domain model 104 can be based on various ML algorithms such as decision trees, linear regression, neural networks, Bayesian networks, support vector machines (SVMs), nearest neighbor and the like. The domain model 104 can be further trained via one or more of supervised or unsupervised learning. The domain model 104 can be scaled for different field types and value types. The domain model 104 can provide one or more definitions for various types of fields such as (regex (e.g. Account number), controlled (e.g. (annual plan maximum=do not accumulate)=look up, freetext=analytics, non-standard elections (in- and out of network comments) and the like. In an example, 3-4 fields to be updated may be identified for certain field types. The information to be processed for identifying the key-value pairs can include one or more of the email associated with the request 152 and the documents 154 that may be attached to the email and the additional documents 156 that can be retrieved from the external knowledge bases 108 using the request 152 and/or the domain model 104.

AI based techniques such as OCR can be initially employed to convert documents that may be in non-editable image formats to machine readable textual files. Then textual processing techniques including, but not limited to, parsing, tokenization, stop word removal, stemming, lemmatization, etc. and Natural Language Processing (NLP) techniques such as, but not limited to, text/pattern matching, named entity recognition (NER) can be employed to identify the terms from the domain model 104 which may be relevant to the request 152 and to extract the values for the terms from the request 152. The domain model 104 can be designed to prioritize flexibility or performance speed in different examples. The document processing system 100 can therefore be configured to compare a variety of fields and field types across multiple documents simultaneously on a single screen of a user interface. For example, the screen can be split into multiple portions to allow review of the multiple documents simultaneously. while the domain model 104 can validate the fields. In an example, the document processing system 100 can provide GUIs for user validation of the fields.

The documents 154 in the request 152 which can include one or more component documents, may therefore pertain to various automated processes that can be enabled by the document processing system 100. The automated processes in the benefits enrollment domain can correspond to new plans, renewals, off renewals or particular type of plans (e.g., ERISA) and the like. In an example, the relevant data fields from the documents can be mapped into a single master database. An intent analyzer 106 accesses the extracted information from the request 152 for intent analysis 162 which can output the intent 164. The intent 164 can include data that is indicative of the type of automatic process to be executed by the document processing system 100. As mentioned earlier, the intent 164 can be determined based on NLP and textual data processing techniques. In an example, particular data fields from the domain model 104 can be compared with the name value pairs from the request 152 to determine the intent 164. The examples discussed herein refer to one intent for simplicity. However, it can be appreciated that if multiple process codes are included in the request 152, then multiple intents can be deduced serially or in parallel depending on the configuration of the data processing system 100 and automatic execution of corresponding multiple processes can be enabled.

Determination of the intent 164 enables identification of the input documents and particular fields required for automatic execution of the process in addition to the corresponding output documents or other results that are expected to be generated by the automatically executed process. Based on one or more of the domain model 104 and the intent 164, the relevant documents can be selected and concatenated into a single, internal master document 172. The concatenation into the internal master document 172 can enable robotic process automation (RPA) or downstream processes. The internal master document 172 can be generated in different formats such as a text file, a spreadsheet, an extensible markup (XML) file database, etc. for different use cases based on the nature of the automated process to be executed. Furthermore, the internal master document 172 can be configured to meet ingestion specs of downstream process systems for seamless processing.

Various documents in different data formats can be required for different processes. The required documents can include text files, documents with structured data, database files, and/or image files which may not be in user-editable format and/or searchable, etc. Referring to the healthcare benefits processing example, different combinations of multiple benefits documents can be outlined in the domain model 104 for a single intent type. In an example, the document processing system 100 can query other computing systems such as an external RPA tool to request and receive additional information (i.e. a handshake test). The comparison of values in the documents from the request 152 with the information in the domain model 104 can include fine grained processing including look up e.g., words, terminology and the like. The comparison of documents can also include coarse grained processing such as analytics associated with comments, sentences, paragraphs and the like. In some instances, the document processing system 100 can flag one or more fields for human validation which can be executed via one or more GUIs 140.

The document comparison enables the document processing system 100 to compare documents in a side by side view of different data formats and verify the information supplied in the request 152 for discrepancies. External knowledge base 108 from one or more other/external data sources can be accessed by the document processing system 100 to identify the discrepancies. The external knowledge base 108 can include explicit knowledge such as rules, inputs from subject matter experts (SMEs), machine-generated inputs generated using machine learning, predictive modeling algorithms, etc., RPA requirements such as the output formats that are compatible with downstream processes in external systems, etc. The external knowledge base 108 can also include implicit knowledge including contextual knowledge or mined knowledge gained via implementation of various AI elements. A discrepancy processor 112 determines or identifies the discrepancies between the compared documents. Various types of comparisons that will be detailed further herein can be employed to identify the discrepancies between the documents.

When a discrepancy is identified, the discrepancy processor 112 can analyze the reason for the discrepancy. The analysis can include identifying those data fields wherein the comparisons failed to produce a positive result. In an example, various data models can be employed for comparing the fields/data types. The data field comparisons can be based on features including but not limited to one or more of the data types, field names, and context associated with the field. Threshold probabilities can be defined for the data models wherein the compared fields that meet the thresholds are deemed as matching while those that fail to meet the thresholds are considered as mismatched/unmatched fields.

The mismatched/unmatched fields from the discrepancy processor 112 can be communicated to a data resolver 114 for an intelligent resolution. In an example, the data resolver 114 can access one or more of the external knowledge base 108, content management systems associated with the insurance processes and other external systems, such as those executing downstream or upstream RPA processes in order to automatically identify a resolution to the discrepancy. When an unmatched data field, a non-compliant rule or other reason for the mismatch is determined by the data resolver 114, a solution to rectify the mismatch can also be determined. For example, the solution can include a problem statement regarding the mismatch, the solution can include a suggestion to comply with the rule that the match failed to meet, etc.

If the data resolver 114 fails to automatically resolve the discrepancy, the information can be displayed for user review using one of the GUIs 140. In an example implementation, upon user review and confirmation, the information or the required fields augmented with the matches, discrepancies and resolutions are communicated to the document builder 116 which builds an internal master document 172. The internal master document 172 can be a spreadsheet, a text file, a comma separated values (csv) file and the like which can be consumed by automatically executed processes. The document builder 116 may further present the internal master document 172 for user review. Upon user review and confirmation, the internal master document 172 can be communicated to external systems for enabling RPA of the processes being executed by the external systems. In the event a user does not approve the data, the user can make the changes via the GUI or the user may flag the data for other reviews. The changes or edits made by the user to the extracted information can be stored within the document processing system 100 and used to train one or more of the intent analyzer 106 and the domain model 104 by the feedback collector 118. The document processing system 100 can therefore intelligently automate processes such as benefits setup (including new subscriptions, renewals, maintenance) by automatically extracting required fields from the request 152 and implementing the domain model 104 to enable automatic and manual review and evaluation of documents and implementing RPA to automate the input of the extracted information into the external systems. This can improve the speed, accuracy, and traceability of the automatically executed processes while mitigating against seasonal spikes in resourcing.

The document processing system 100 can also include a performance evaluator 122 that enables a user-specific or a process-specific performance evaluation. For example, when a validation process is being executed, the performance evaluator 122 can provide for false positives in a set of options to be evaluated by a user. The user's response is recorded and analyzed to evaluate the user and/or the process. Responses from different users can be aggregated for a given set including the false positives in order to determine if errors on the false positives are occurring from the user's side or are due to the process. The responses may be evaluated based on a bell curve so that if more users are making a mistake on the false positives then the error on the side of the process can be recorded else the error will be recorded for the user. Based on the recordation of erroneous user responses, the user can be provided with further training on the validation process or the validation process itself can be modified to better guide the users in improving the accuracy. Modification of the process can entail further training of the domain model 104 and/or tweaks to the process rules, changes to the domain-specific terminology, the extracted fields, etc.

Figure 2:
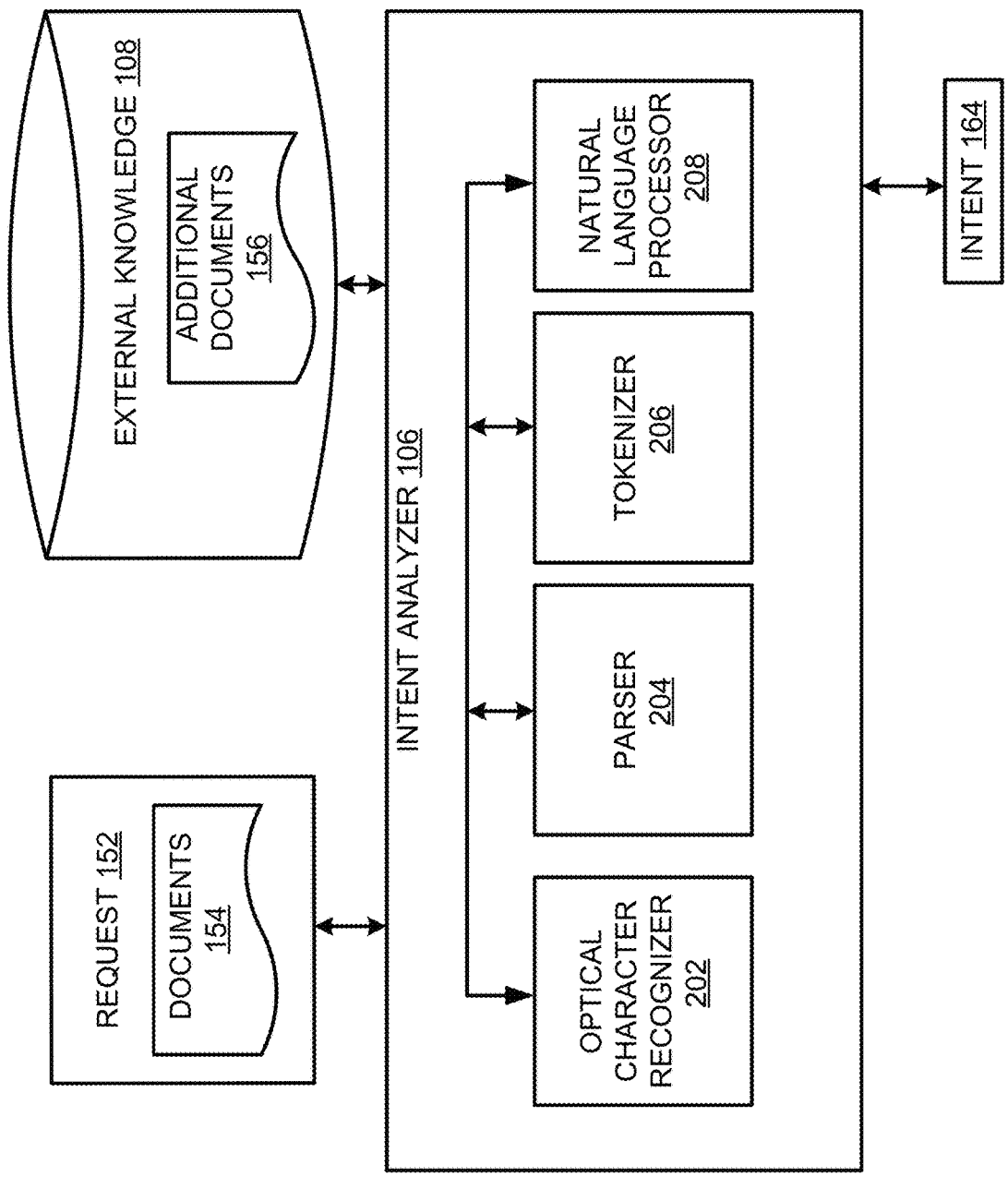
FIG. 2 shows a block diagram of an intent analyzer in accordance with some examples disclosed herein.

FIG. 2 shows a block diagram of the intent analyzer 106 in accordance with some examples disclosed herein. The intent analyzer 106 processes the received request 152 using an optical character recognizer 202, a parser 204, a tokenizer 206 and a natural language processor 208 to identify the intent 164 conveyed in the request 152. As mentioned herein, the request 152 and any of the documents 154 associated therewith can be received in various formats which can include structured machine-readable data such as an email, a spreadsheet, a text document, etc. or as an unstructured, non-machine readable/editable format such as a scanned image. Based on the formats of the request 152 and its contents including the documents 154, an optical character recognizer 202 can be employed. The parser 204 and the tokenizer 206 are employed to obtain word tokens from one or more of the output of the optical character recognizer 202 or the content of the request 152. The natural language processor 208 can also be employed to identify the intent 164 based on explicit and implicit knowledge included in the external knowledge base 108. In an example, the intent 164 or identifying indicia of the automatically executed process to be enabled in response to the request 152 can be obtained not only using the textual or other content from the request 152, the documents 154 and the like but also via contextual information. For example, the contextual information can include placement of a text identifier within a document, textual content (e.g., words surrounding a term of interest), the document in which the term of interest occurs, and the like.

The intent 164 therefore, can be used to identify the automated process to be executed. In an example, the intent 164 can also include specifications associated with the automated process. For example, the automated process to be executed can pertain to de-identification of patient identification data in the EHR or subscriber information from other documents wherein the identifying indicia of one or more individuals/subscribers are anonymized if re-identification of the original patient details from the EHR is desired or pseudonymized wherein no re-identification is possible. Generally, documents such as patient EHR document subscriber information that not only includes the health data of a patient but also the individual identifying indicia such as the legal name, social security number, contact information, etc., of the patient. In this case, the intent 164 can include terms to convey that the de-identification process is to be executed. A de-identification domain model can be used for identifying the terms from the request 152. The process rules can provide specifications such as whether the patient identification data is to be replaced by other strings and the strings to be used as the replacements or whether the patient data is to be completely blocked out, etc. Similarly, the intent 164 can convey that the automated process to be executed pertains to an appeal task where a healthcare service provider appeals a rejection or a denial in whole or in part of an insurance claim for payment made for a service rendered to a patient by the provider. When the request pertains to a provider's appeal, the intent 164 can be analyzed to identify specific terms or particular forms in the documents 154 accompanying the request 152 based on an appeal domain model. The process rules can specify the fields to be included in the provider appeals documents, the field values to be included, whether the provider appeal is timely or premature, based on a time period associated with the provider settlement.

Figure 3:
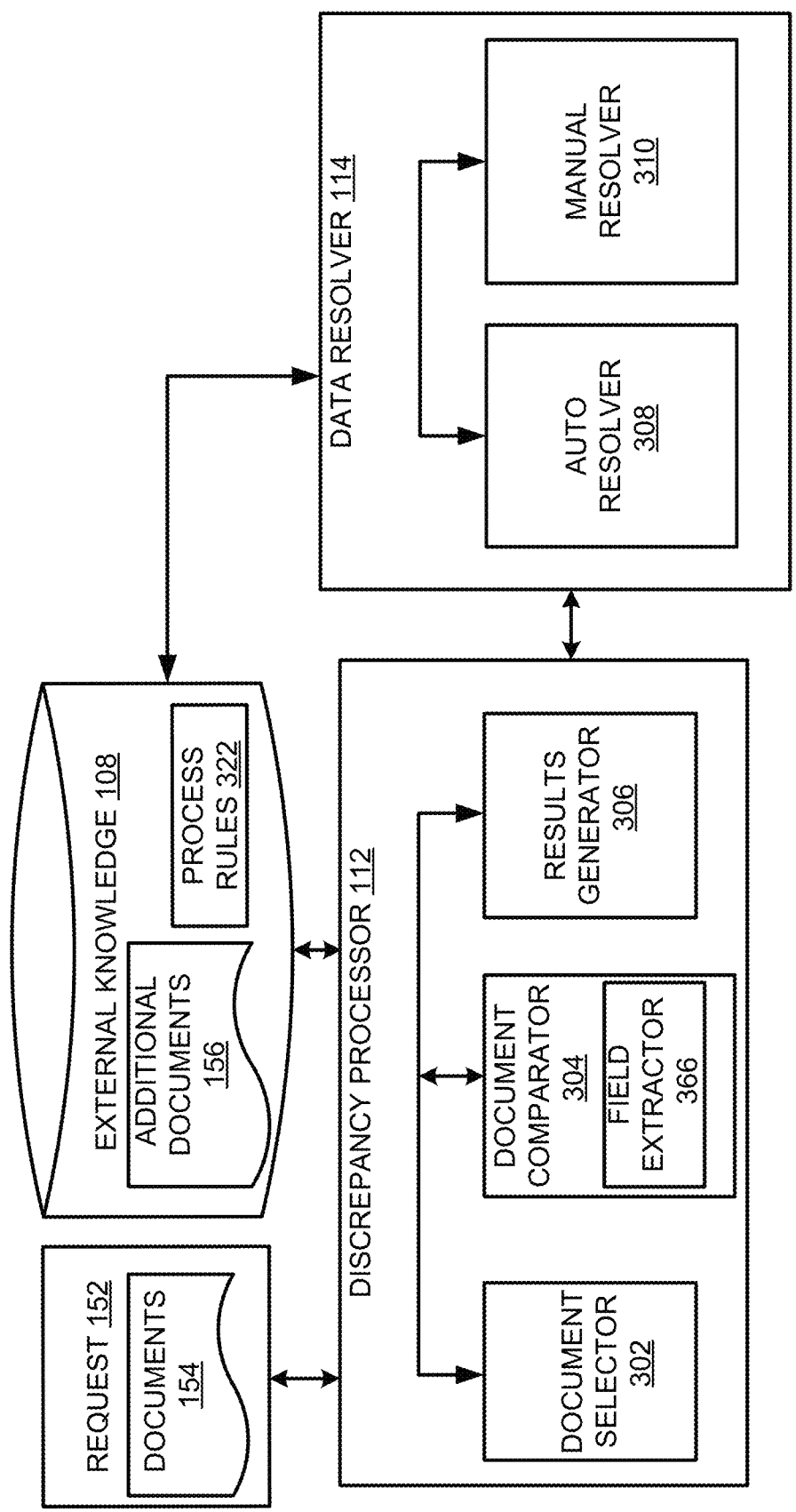
FIG. 3 shows a block diagram of a discrepancy processor and a data resolver in accordance with the examples disclosed herein.

FIG. 3 shows a block diagram of the discrepancy processor 112 and data resolver 114 in accordance with the examples disclosed herein. The discrepancy processor 112 includes a document selector 302, a document comparator 304 and a results generator 306. The document selector 302 enables selection of documents to be compared in order to enable automated execution of the process pertaining to the request 152. As mentioned herein, the document selection is enabled by both the external knowledge base 108 and the domain model 104. In particular, process rules 322 included in the external knowledge base 108 enable identification of the relevant documents needed for the automatic execution of the process. The documents selection not only involves the documents 154 received in the request, but also the additional documents 156 from the external knowledge base 108 that can be retrieved based on the intent 164, the domain model 104 and the process rules 322. In an example, the document selector 302 can include AI models such as classifiers that can be explicitly trained for document selection using labelled training data.

The document comparator 304 can execute comparison routines on the selected documents based on the process rules 322. Referring to the healthcare domain for example, the request 152 can pertain to an automated process such as a risk adjustment process wherein a diagnosis for a patient put forth by a medical provider such as a physician is to be validated and confirmed. The document comparator 304 can compare information from the documents in a patient's file history such as the patient's electronic health record (EHR) to a list of documents as specified by the process rules 322. It can be appreciated herein that the documents employed by the document comparator 304 for comparisons may not only include documents with unstructured data such as scanned reports, bills, hand-written prescriptions, etc. but also structured data such as values from a database or a comma separated values (CSV) file and the like. More particularly, the patient's EHR can include one or more of the documents 154 received in the request 152 and the additional documents 156. A field extractor 366 included in the document comparator 304 can extract fields from the EHR. The fields thus extracted can be compared to the fields specified by the process rules 322. Based on the automated process to be executed, a domain model can be employed. In an example, a diagnosis domain model which corresponds to the domain model 104 customized to the risk adjustment process can be employed. The comparisons can include comparison on name-value pairs wherein the values can be determined to correspond to those as specified in the process rules 322 or the values can be determined to be out of bounds to the values specified by the process rules 322.

The output of the document comparator 304 can include particular fields or name-value pairs and their respective comparison metrics such as similarities for example, between the documents being compared. The results generator 306 can compare the metrics to the corresponding thresholds thereby determining the existence of discrepancies. For example, for a given field including a name-value pair extracted from one or more of the documents 154, 156, the similarities between the data extracted from the documents 154, 156 and the values as specified by one or more of the process rules 322 can be compared to similarity thresholds. If the similarity threshold is satisfied, then the results generator 306 does not record a discrepancy and proceeds towards generating the internal master document 172 that enables automatic execution of the process. If the similarity threshold is not satisfied, then a discrepancy can be recorded.

Whenever a discrepancy is recorded, the data resolver 114 receives the output from the discrepancy processor 112 for resolution of the discrepancy. An auto resolver 308 included in the data resolver 114 be configured to initially process the discrepancy for automatic resolution. In an example, the domain model 104 can be employed for auto resolution. For example, the domain model 104 can include various formats associated with an entity name such as XYZ or XYZ Inc., etc. The auto resolver 308 can access such alternative formats, synonyms, etc. to automatically resolve discrepancies. The various matches that can occur between different values that can be used by the auto resolver 308 are detailed herein. If the discrepancy cannot be automatically resolved, a manual resolver 310 can alert a user via one of the GUIs 140 to receive manual input for the discrepancy resolution. The manual input thus received can be obtained by the feedback collector 118 as training data for training the document processing system 100.

Referring to the example of a de-identification process, the discrepancy processor 112 can be configured to identify fields for de-identification as specified by the process rules 322 of the de-identification process. If the fields from the documents 154 do not match those specified by the process rules 322 of the de-identification process, then the data resolver 114 can automatically or manually resolve the discrepancies. Similarly, the fields for processing the documents 154/156 for a provider appeals process can be extracted and validated. If the validation procedure fails, the data resolver 114 can employ the automatic resolver 308 or the manual resolver 310 for the resolution of the discrepancies.

Figure 4:
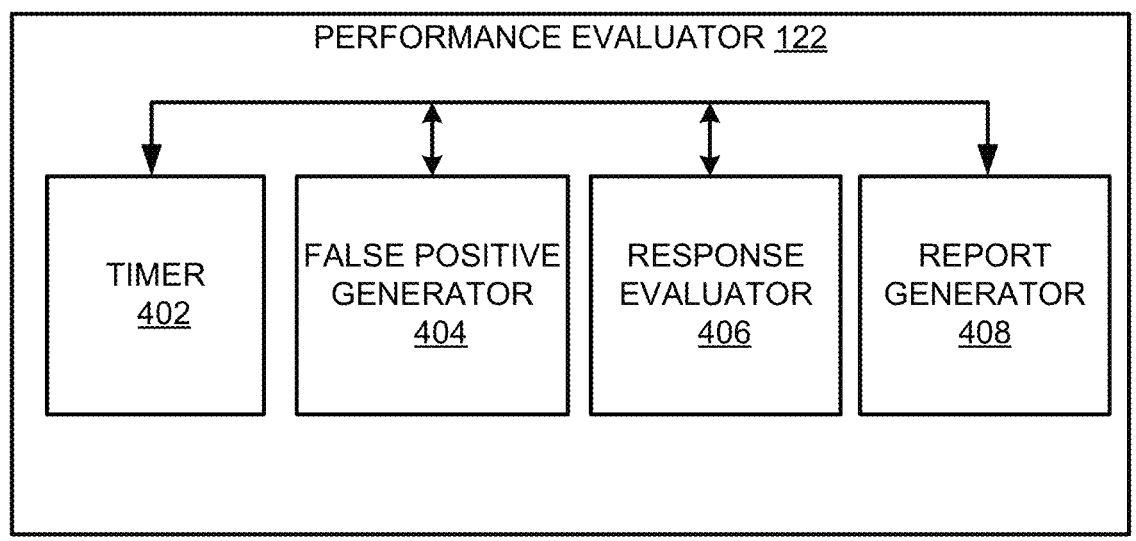
FIG. 4 shows a block diagram of a performance evaluator in accordance with the examples described herein.

FIG. 4 shows a block diagram of a performance evaluator 122 in accordance with embodiments described herein. The performance evaluator 122 can be configured to generate false positives during the functioning of the document processing system 100 to evaluate the performances of one or more of the user and/or the document processing system 100. The performance evaluator includes a timer 402, a false positive generator 404, a response evaluator 406 and report generator 408. The timer 402 can be configured to generate a signal at different intervals to generate false positives during process flows of the document processing system 100. Whenever the signal is received from the timer 402, the false positive generator 404 can manipulate thresholds associated with comparisons, discrepancy resolutions, etc. Therefore, the performance evaluator 122 causes the document processing system 100 to include a false positive value for user review/validation. The user's response to the false positive value is recorded and evaluated by the response evaluator 406. If the user correctly identifies the false positive value(s), the user can be deemed as trained on the operations of the document processing system 100 and/or the particular process being automated. If the user fails to identify the false positive value, the user and/or the process can be flagged for further training. In flagging the user, or the process, aggregated user responses can be employed so that the majority of the responses from other users to similar false positive values can be used in determining whether the user or the process need further training. The report generator 408 generates a report for the training accordingly.

FIG. 5 shows a tabular form 500 of example validations associated with various fields in the request 152. It can be appreciated that the validations are shown only by the way of illustration and that other validations can be implemented by the document processing system 100 in accordance with examples disclosed herein. The validations can be specified either as part of the term definitions in the domain model 104 or as part of the process rules 322. The table 500 includes example inputs 502, the validation process 504, the expected output of the validation process 506 and some example fields 508 which may undergo the validation processes.

FIG. 6 shows a tabular form 600 of example matches that can occur between various values. These matches can be employed by one or more of the document comparator 304 and the data resolver 114 in executing document comparisons and discrepancy resolutions. Various comparison types such as but not limited to direct/identical matches, identical matches without punctuation/capitalization and the like, set comparison, state comparison, range comparison, fuzzy matches, synonyms, abbreviations, acronyms, presence of particular terms and comparison of derived values can be executed by the document processing system 100.

Figure 7:
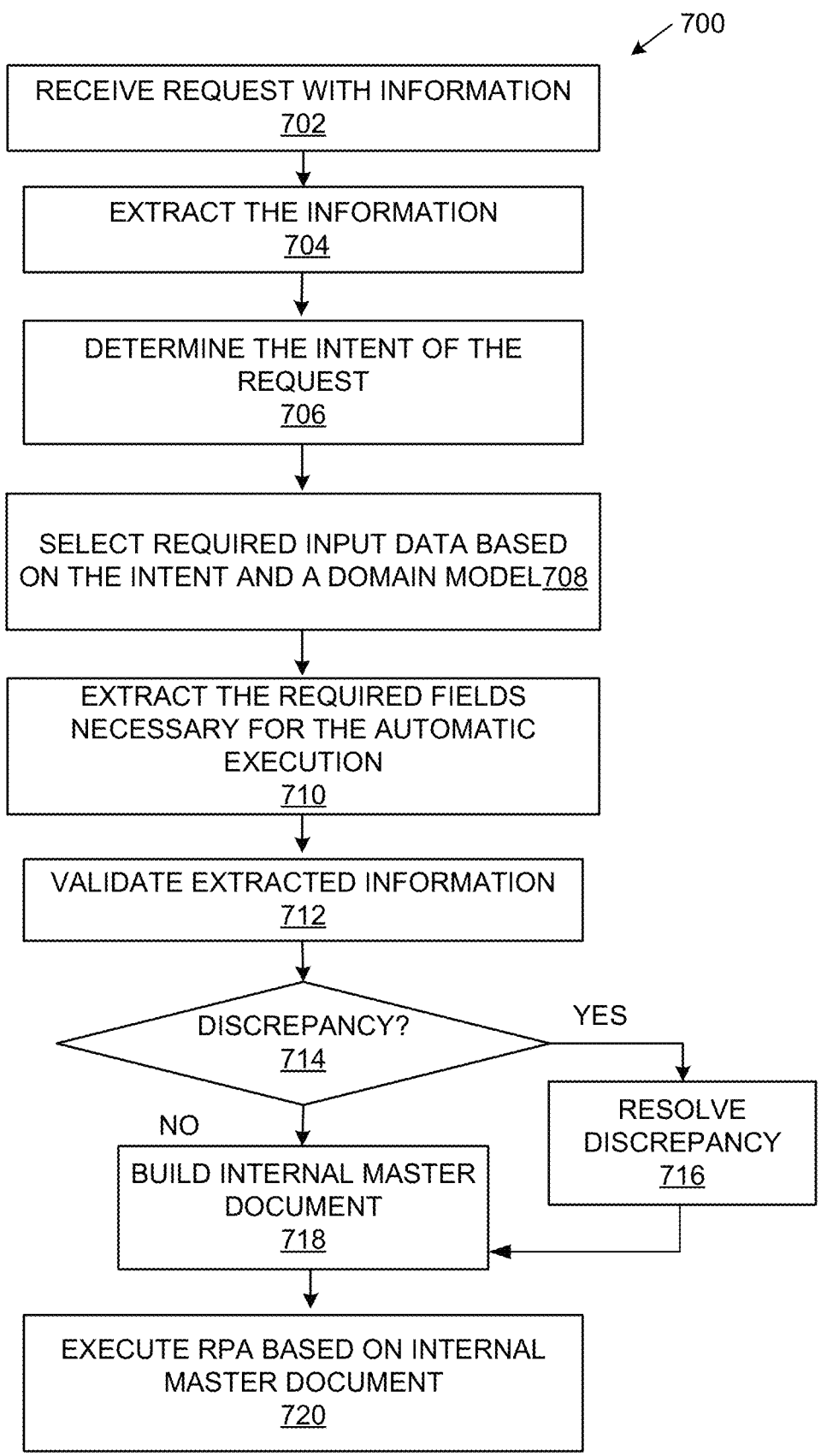
FIG. 7 shows a flowchart that details a method of document processing in accordance with the examples disclosed herein.

FIG. 7 shows a flowchart 700 that details a method of document processing in accordance with examples disclosed herein. The method begins at 702 wherein a request 152 including information associated with a process to be automatically executed is received. Referring to an example in the healthcare domain, the request 152 can pertain to an email which includes a specific request type e.g., renewal of health benefits with the required documents attached. In an example, the specific request type can include text conveying the intent or specific code indicating that a sender of the email is requesting benefits renewal. The request 152, which, in the example being discussed includes an email, is analyzed using textual processing techniques as detailed herein and the information including the attachments is extracted at 704. At 706, an intent of the request 152 is determined using the domain model 104. Based on the determined intent 164, the automatic process to be executed is identified. The identification of the process in turn enables relevant information from the request 152 and the domain model 104 to be selected. The required input data including the documents 154 from the request 152, the additional documents 156 from the external knowledge base 108, the required fields from the documents 154, 156 or the domain model 104, etc., can be selected for further processing at 708. At 710, the fields necessary for the automatic execution of the process are extracted from the selected input data. In an example, the intent 164 can determine the process to be automatically executed while the domain model 104 can supply the information or the fields necessary for the automatic execution of the process. In an example, manual validation of the fields can be executed. The information including the selected input data is validated at 712. The validation can include analyzing the extracted information and the intent 164 in light of the domain model 104 and the process rules 322. In an example, similarity measures or other information comparison techniques, such as, thresholds and the like can be employed to analyze the documents for discrepancies at 714.

If it is determined at 714 that the fields are valid (i.e., no discrepancies exist), then an internal master document 172 is built at 718 from the validated fields. The valid fields extracted from the request can be transformed into a format, such as a spreadsheet format to build the internal master document 172 which feeds downstream RPA. At 720, the RPA can be executed by an external system or by the document processing system 100 based on the internal master document 172. For example, the RPA can employ techniques such as text matching, NER to match attributes and values from the internal master document 172 to an eForm thereby automatically feeding values from the internal master document 172 into the eForm such as an enrollment form and the like. In another example, the RPA can include multi-stage processes wherein the eForm can be further used to generate a contract or enroll plan participants and the like. The contracts or list of enrollment participants and the like can also be automatically be communicated to the concerned persons or automatically loaded into designated processor-readable storage media.

If it is determined at 714 that the fields are not valid and that one or more discrepancies exist (YES), the method proceeds to 716 wherein the discrepancies are resolved based on data from one or more of the intent 164, the domain model 104 and the external knowledge base 108. In an example, the resolution of the discrepancies can require human intervention. Examples of user edits to resolve discrepancies are discussed infra. External knowledge base 108 including implicit knowledge and explicit knowledge can be employed to automatically look up and identify possible resolutions to the discrepancies as outlined herein. The required fields augmented with matches, discrepancies and the recommended solutions can be displayed for explicit human resolution and validation in an example. For example, if further information is needed, a human user may send an email request for the requisite information. Upon the resolution of discrepancies, the method returns to 718 to build the internal master document 172 which is then used for the automatic execution of the process.

As mentioned herein the document processing system 100 can be customized to automate various processes. The customization can include customizing the domain model 104 to include the domain-specific terminology, parameters, fields and the like pertaining to the process. Furthermore different external knowledge bases can be accessed depending on the process to be automated. Similarly, the discrepancy processor 112, the data resolver 114, the document builder 116 can be configured to execute functions corresponding to the particular process to be automated. The document processing system 100 can thus be configured to automate one or more processes via providing different customized domain models. The selection of the domain model 104 for the particular process being automated is enabled by the intent 164 derived from the request 152. Accordingly, various flowcharts are described herein that detail the automation of different processes by the document processing system 100. Again, as mentioned herein the processes described below may pertain to the healthcare domain, however, it can be appreciated that the processes from other domains such as manufacturing, financial and the like can be similarly automated.

Figure 8:
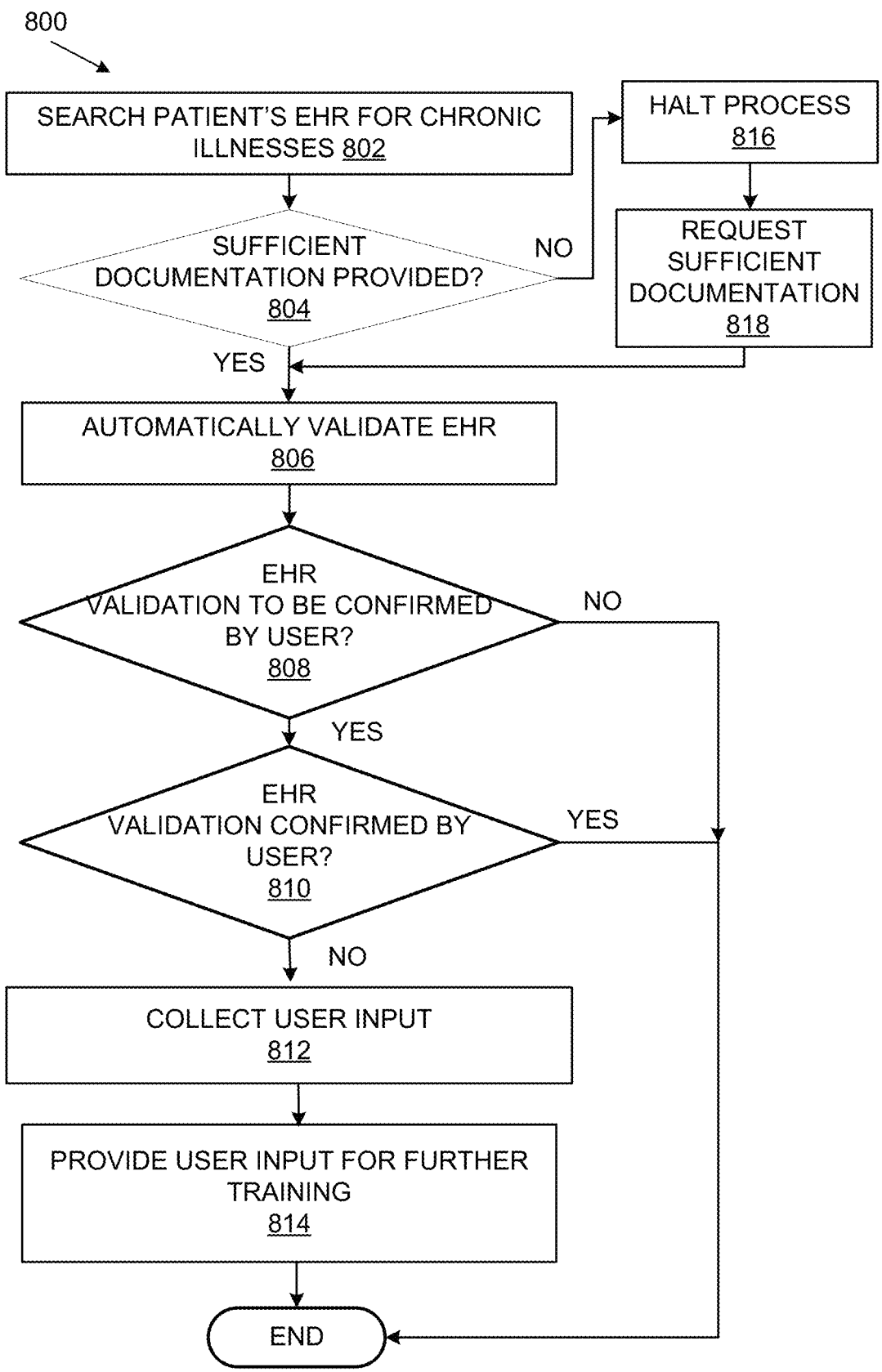
FIG. 8 shows a flowchart that details automation of a risk adjustment process in accordance with the examples discussed herein.

FIG. 8 shows a flowchart 800 that details automation of a risk adjustment process in accordance with examples discussed herein. Specific chronic conditions can be considered as risk adjusted conditions. The risk adjusted conditions and the supporting evidence are analyzed to validate that the conditions exist. For example, the document processing system 100 when implementing a risk adjustment process can analyze a patient's medical record (e.g., EHR) and identify that a doctor diagnosed a patient with diabetes and validates such diagnosis further based on patient medication such as metformin, lab results from AI C test, etc.

The descriptions related to the steps of receiving a request, identifying an intent and selection of the domain model are not repeated at this point for brevity as these are common across the various processes described herein.

Accordingly, the description of the initial process steps of: determining that the request pertains to risk adjustment process, selecting a risk domain model and selecting documents required for the automation of the risk adjustment process are not repeated here for brevity. In the risk adjustment process, the documents 154, 156 can pertain to a patient's EHR which can include a listing of the patient's providers' visits (encounters), and related documentation such as prescriptions, bills, reports, etc. At 802, the patient's EHR is searched for specific chronic illness to identify the encounter(s) for which the member requests reimbursement. Chronic illnesses can be identified, for example, via diagnosis codes that occur within the EHR. At 804, it is determined if the patient's EHR provides documentation that satisfies eligibility criteria for reimbursement. In an example, the document comparator 304 can be employed to determine if the patient's EHR meets an eligibility criteria as outlined by the process rules 322. By the way of illustration, the eligibility criteria can include documents that indicate that the illness is being measured/monitored, evaluated, assessed/addressed and treated (MEAT).

If it is determined at 804 that sufficient documentation supporting the chronic illness is not provided, the process can be halted at 816 and sufficient documentation can be requested at 818. If sufficient documentation is provided, the EHR is automatically validated at 806 based on the risk domain model and the process rules 322 for the risk adjustment process. Based on the confidence levels associated with the validation at 806, the process can terminate at 806 in an example. In an implementation the output of the validation process can be presented to a user on an output GUI for confirmation at 808. At 810 it is determined if the user has confirmed that the EHR validation. If yes, the method terminates/ends. If it is determined at 810 that the user has not confirmed validation or eligibility for reimbursement, the method moves to 812 to collect user input. The user input thus collected can be provided to the feedback collector 118 for further training of the document processing system 100 at 814. Upon the validation of the EHR, an automated reimbursement may be initiated based on the validated, confirmed EHR.

Figure 9:
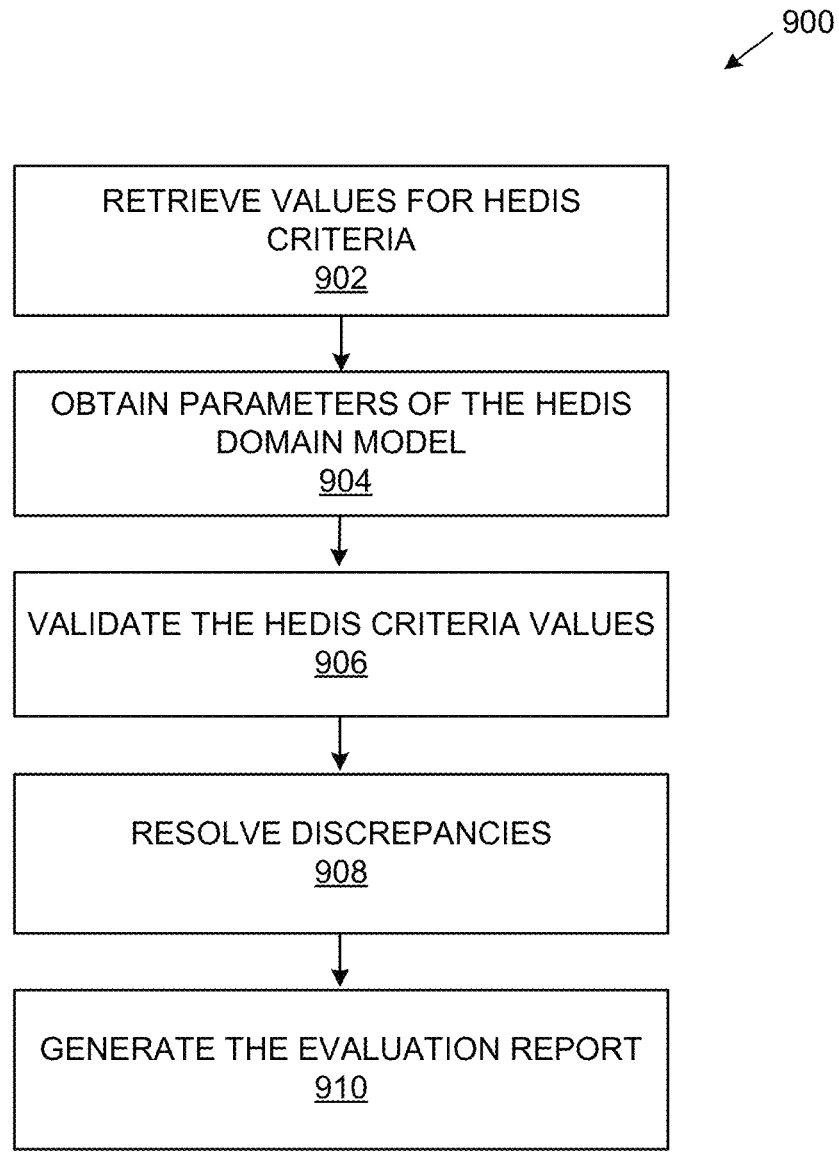
FIG. 9 shows a flowchart that details automation of a process of evaluating a healthcare plan under Healthcare Effectiveness Data and Information Set (HEDIS) in accordance with some examples discussed herein.

FIG. 9 shows a flowchart 900 that details automation of a process of evaluating a healthcare plan under Healthcare Effectiveness Data and Information Set (HEDIS) in accordance with examples discussed herein. HEDIS is a performance measurement tool that enables evaluation of healthcare plans using various criteria including but not limited to effectiveness of care, access/availability of care, experience of care, utilization and relative resource use and healthcare plan description information. The process outlined in the flowchart 900 can employ approximately 84 measures under HEDIS to evaluate healthcare plans. More or less measures may be employed for evaluation depending on the nature of the healthcare plan. The documentation such as, healthcare plan documentation, can be analyzed for justification of quality measures pertaining to a member's care such as body mass index (BMI), blood pressure measurements, diabetes management, cancer screenings, etc. to validate whether or not that the measures were met.

In this example the request 152 can pertain to a HEDIS evaluation of a healthcare plan and the request 152 can include one or more documents related to the healthcare plan and additional documents 154 related to the healthcare plan can be retrieved from the external knowledge base 108 based on the intent 164 derived from the request 152. Also, the domain model 104 in this example pertains to a HEDIS domain model which can include the various criteria used for HEDIS evaluation as process parameters along with the variations in terminology, synonyms, antonyms, etc. The process rules 322 can specify the values and the thresholds for the criteria that determine whether or not a given plan meets the criteria. At 902, the various HEDIS criteria values from the documents 154, 156 received in the request 152, or retrieved from the external knowledge base 108, are retrieved. The parameters of a HEDIS domain model can correspond to the HEDIS criteria used to evaluate a healthcare plan are obtained at 904. The criteria values retrieved at 902 for the parameters from the HEDIS domain model are validated at 906 based on thresholds as specified in the process rules 322 corresponding to the HEDIS evaluation process. Any discrepancies that are identified are resolved at 908 via one or more of automatic resolution or manual resolution as disclosed herein. The internal master document 172 corresponding to a report on the healthcare plan evaluation under the HEDIS measures is generated at 910.

Figure 10:
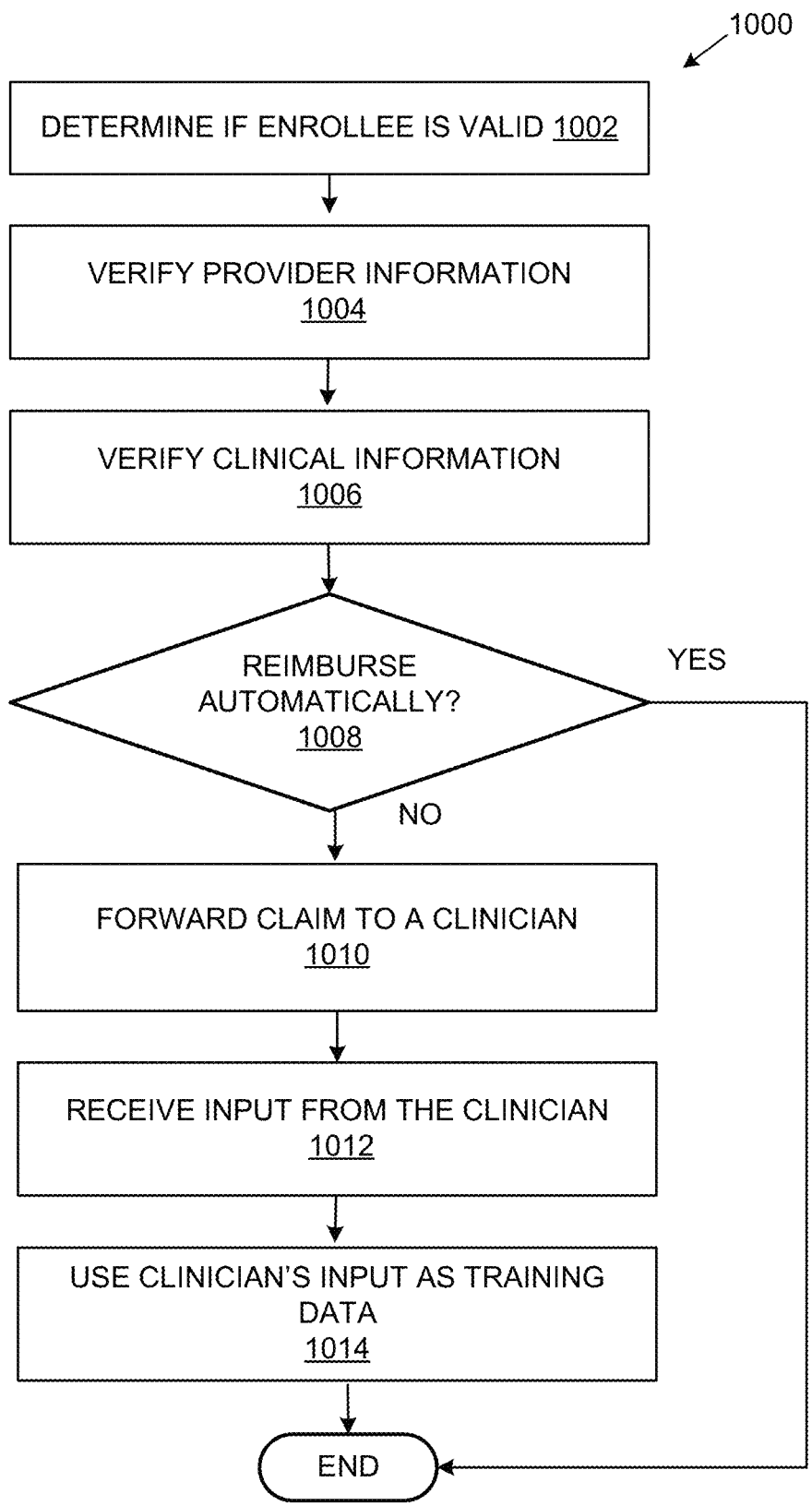
FIG. 10 shows a flowchart that details a method of utilization management associated with a healthcare provider in accordance with the examples disclosed herein.

FIG. 10 shows a flowchart 1000 that details a method of utilization management associated with a healthcare provider in accordance with the examples disclosed herein. In this example the request 152 received from a plan enrollee can pertain to a utilization management process wherein the intent 164 is to make a claim on a healthcare plan. The request 152 can be processed by the document processing system 100 in accordance with the examples disclosed herein to automatically determine if the claim is valid and should be reimbursed. Accordingly, the request 152 can include one or more documents 154 related to the claim such as prescriptions, receipts, lab reports and the like. Based on an analysis of the intent 164 of the request 152, other documents 156 such as the enrollee's signup sheet/database, the enrollee's healthcare plan information which are retrieved from the external knowledge base 108, the process rules 322 and the like are retrieved. The utilization management domain model which corresponds to the domain model 104 customized to the utilization management process is employed to facilitate the retrieval of the documents, etc. Moreover, the process rules 322 can specify the values or requirements that the enrollee and/or the provider must meet in order to secure reimbursement.

Various AI techniques pertaining to text recognition, comparison and classification of data can be used to identify and differentiate between the patient's information and the providers' information. The method can begin at 1002 wherein the enrollee information is verified in order to determine that the enrollee is a valid member of the healthcare plan associated with the claim. At 1004, the provider information including the rendering provider and the referring provider from the claim is verified to determine that the providers are members of the healthcare plan. Verification of the provider information can include determining that the providers are good partners and are not on, for example, a bad provider list. At 1006, the clinical information from the claim is verified objectively to determine if a medical necessity of a particular procedure/prescription is recorded in the documents 154, 156 and that the claim can be automatically reimbursed. At 1008 it is determined if an automatic decision regarding reimbursement of the claim can be rendered by the document processing system 100 based on a comparison of the description of the condition(s) in the EHR with the description of the condition(s) as detailed in the necessity for the procedure in the external knowledge base 108. The descriptions can also include comparison of number data to determine if the numbers from the lab reports meet certain thresholds that necessitate the test. In an example, such necessity descriptions can be specified in the process rules 322. In an example, the process rules 322 can further specify if a particular claim can be auto approved or needs to be forwarded to a clinician based on an urgency factor. For example, a procedure to heal a dangerous wound from an accident can be automatically approved. Specific words such as 'urgent', 'asap', 'immediate', etc. can be employed to signify the urgency. If an automatic decision for reimbursement is rendered at 1008, the decision can be provided to a user for confirmation in one example. In another example, the decision to reimburse can be automatically implemented without user confirmation and the procedures to reimburse such as depositing the reimbursement amount in a bank account of the enrollee, etc. can be further executed.

If an automatic decision for reimbursement could not be made at 1008 (NO), the documents 154, 156 and the other data which may have been extracted from the request 152, etc. can be forwarded to a clinician at 1010 such as a nurse to receive a decision regarding the reimbursement. The input from the clinician is received at 1012 regarding reimbursement of the claim. In an example, the clinician's input can be used as training data for the document processing system 100 at 1014. The clinician can provide explicit input regarding the exact fields within the documents that are to be filled in or the documents which are missing or other rules that were not followed that caused a rejection of the reimbursement. Thus, newer knowledge from the clinician's training can be updated to the document processing system 100.

Figure 11:
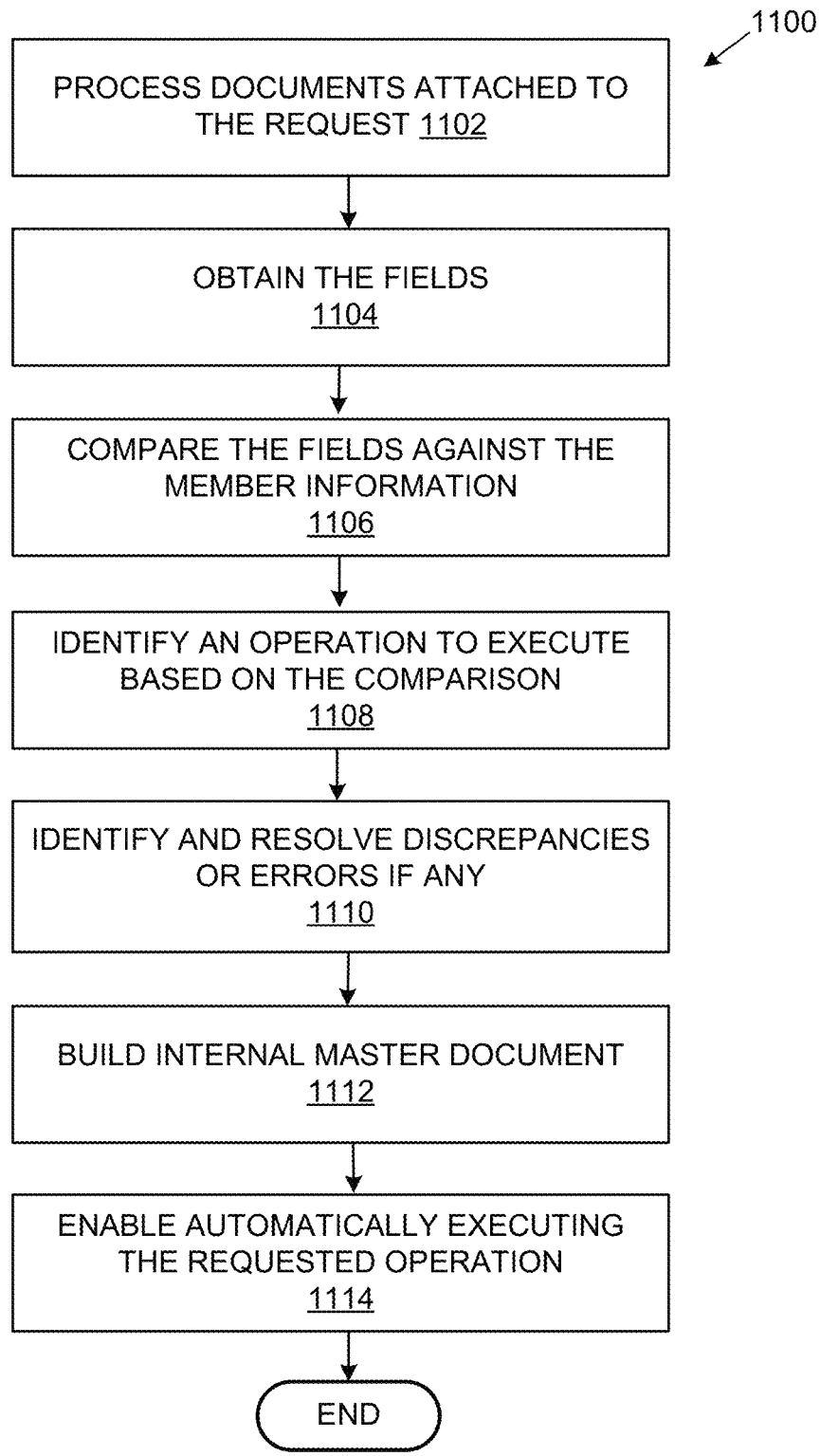
FIG. 11 shows a flowchart that details an intelligent, automatic method of enabling health care benefits to enrollees in accordance with the examples disclosed herein.

FIG. 11 shows a flowchart 1100 that details an intelligent, automatic method of providing health care benefits to enrollees in accordance with the examples disclosed herein. As mentioned above the request 152 in this example would convey an intent 164 to enroll/add, update or delete members to the healthcare plan wherein an enrollment domain model corresponds to the domain model 104 and inputs the terminology fields, etc. related to the enrollment domain. Upon extracting the intent 164 from the request 152, the documents 154 attached to the request 152 are processed at 1102. In an example the documents can include enrollment forms to update member or enrollee information or delete an enrollee from the membership to the healthcare plan. The fields for processing the forms are obtained at 1104. The fields can be compared against the member information associated with the healthcare plan at 1106 for example, in the external knowledge base 180. Based on the comparison, an add, an update or a delete operation on member information can be identified at 1108. At 1110 discrepancies or errors if any are identified and resolved. For example, if updates to member information indicate a change in a social security number, it may indicate an error which needs to be resolved. Automatic resolution routines can be executed to identify similar information from multiple other resources and may automatically update, for example, the SSN info of the member. Alternately human intervention may be sought in order to fix the error. At 1112, the internal master document 172 can be built by aggregating necessary information received in the request 152 and retrieved from the external knowledge base 108. The automatic execution of the requested operation of adding, updating or deleting the member information is enabled at 1114.

In addition to member information changes to a healthcare plan, the document processing system 100 can also be configured to add, delete or update provider information. As described above, the intent 164 to change the provider information is identified from the request 152, the documents 154, 156 are retrieved from the request 152 and the external knowledge base 108. Accordingly, the forms or requests with member/provider information that is to be updated are analyzed. Such updates could include address changes, changes to contact information such as telephone number, etc. The request 152 to update, add or delete a provider information can be received for example, via an email or a fax. The fields from these documents can be compared and information can be updated based on the intent 164. A discrepancy resolution routine as described above for updating the membership information can also be implemented for updating the provider information.

The discrepancy processor 112 can identify the required fields and analyze the contextual information to identify the operation to execute. The document processing system 100 can handle the fields being on one page or can collate fields spread across multiple pages in different data sources. The contextual information enables the document processing system 100 to identify the information to be updated for a given provider. A provider management domain model corresponds the domain model 104 and includes variations of words, such as nicknames, abbreviations that are synonymous with a term spelled out, etc. When adequate information is provided (e.g., in terms of enough fields) the requested operation to add, update or terminate a provider can be automatically executed.

When adding specific providers, the request 152 can include more than one piece of provider information. For example, a hospital may require addition of ten doctors and a single email with the information regarding all the doctors to be added can be received. Moreover, addition of providers can include provider credentialing wherein the provider information such as, but not limited to, the provider's social security number (SSN), diploma information, etc. that are to be verified are identified. For example, the document comparator 304 can identify documents such as diplomas, and the types of words that are to be identified (e.g., school, grade point average (GPA), address, etc.). Moreover, the discrepancy processor 112 can be configured to check for errors and consistency. As described herein for other processes, the document processing system 100 automatically identifies and classifies the various documents and the user can provide the final approval.

Figure 12:
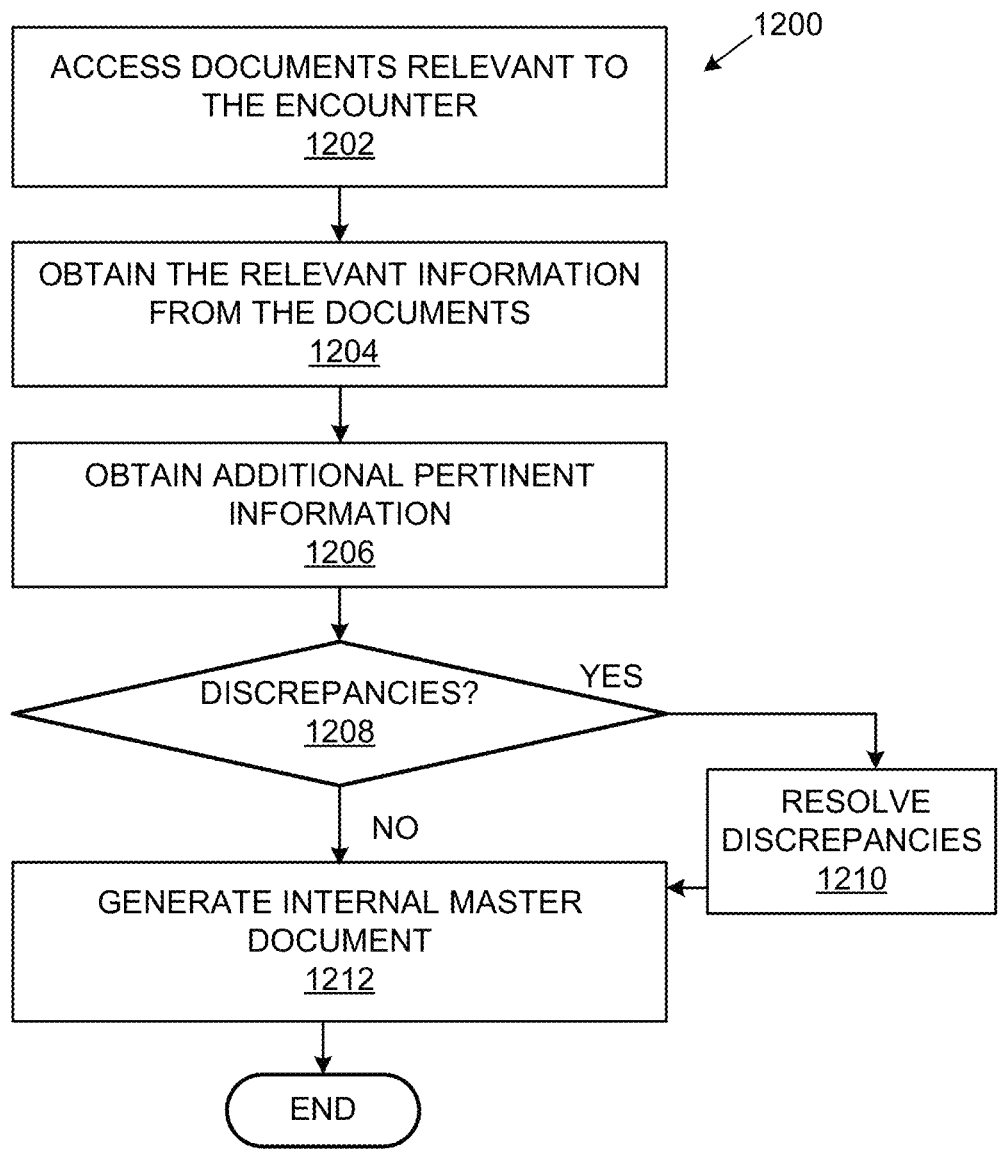
FIG. 12 shows a flow chart that details a method of automating the billing process for a provider in accordance with the examples disclosed herein.

FIG. 12 shows a flow chart 1200 that details a method of automating the billing process for a provider in accordance with the examples disclosed herein. Again, in this example, the request 152 would pertain to billing a healthcare plan for services rendered by a healthcare provider to an enrollee during an encounter. Accordingly, the intent to bill can be derived from the request 152 and a medical billing domain model, corresponding to domain model 104, is accessed to facilitate the automated billing process. The billing domain model can include the terms related to the particular billing domain (e.g., medical billing or even a particular specialized medical billing), the definition of the terms within the billing domain such as the procedures or medications or other services for which bills/invoices may be raised, synonyms, acronyms, nouns including proper nouns such as names of the providers, nicknames, etc., verbs, and the like.

At 1202, the documents relevant to the encounter can be accessed from the request 152. At 1204, the relevant information to bill the healthcare plan is obtained from the documents attached to the request 152 and/or the external knowledge base 108. By the way of illustration, the procedures conducted during the encounter, the prescriptions written, the medication provided, the provider information, etc., can be obtained from the documents accessed with the request 152. On the other hand, the information regarding the healthcare plan to be billed can be retrieved from the external knowledge base 108. Additional pertinent information such as the amounts to be billed, the documents needed for billing, etc. can be obtained from the process rules 322 at 1206.

At 1208, it is determined if any discrepancies exist that need to be resolved. The discrepancies can be identified by the comparison of the additional pertinent information with the document(s) or the information in the request 152. The comparisons can be based on the process rules 322. In an example, the process rules 322 can specify the amounts to be billed in terms of percentages or dollars, the entity the invoice is to be directed towards, the date or time period if any by which the bill is to be submitted, and the like. Based on the comparison, if it is determined that the amount is greater than those specified in the process rules 322, a discrepancy can be raised. Similarly, if there is a mismatch between the insurance plan information between the document in the request 152 and the additional pertinent information a discrepancy can be raised. Thus, the process rules 322 can define particular discrepancies that can be raised based on the various field mismatches that are likely to occur during the billing process.

If a discrepancy is raised (YES), the process moves to 1210 to resolve the discrepancy and then moves to 1212 to generate the internal master document 172. As mentioned herein, the discrepancy can be automatically or manually resolved. For example, if a discrepancy is raised due to mismatch of a provider name such as 'John Doe' versus 'J. Doe', the billing domain model can be used to automatically resolve the discrepancy. Or if there is a mismatch of dates between two documents associated with the request 152, then date information from other documents can be used to automatically resolve the mismatch. The auto resolver 308 can be configured for such automatic resolution of discrepancies for different fields or data elements that may be encountered during the billing process.

If no discrepancies exist (NO), the process moves to 1212 to generate the internal master document 172 that enables automatically billing a healthcare plan for the encounter. The internal master document 172 can collate the information from the different sources that is being collected and analyzed during the automatic billing process. For example, the internal master document 172 can include the patient's name, the encounter date, services rendered and the service provider information from the request 152, the document attached to the request 152, any definitions or clarifications related to the services can be obtained from the domain billing model, the amounts to be billed can be obtained or calculated based on the process rules 322 which in turn may derive the amounts from the healthcare plan documents, etc.

The format and the content of the internal master document 172 enable it to function as not only a centralized repository for the information but also as an input document to the execution of the automatic billing process. In an example, the internal master document 172 can be displayed to a user for review and approval. Upon the user's approval, the automatic billing task can be executed. The automatic billing task can include automatic generation and transmission of another request via an invoice email or fax, etc. as specified by the process rules 322. The invoice email can include relevant billing information along with the documents necessary for the billing, again, based on the specifications in the process rules 322.

Figure 13:
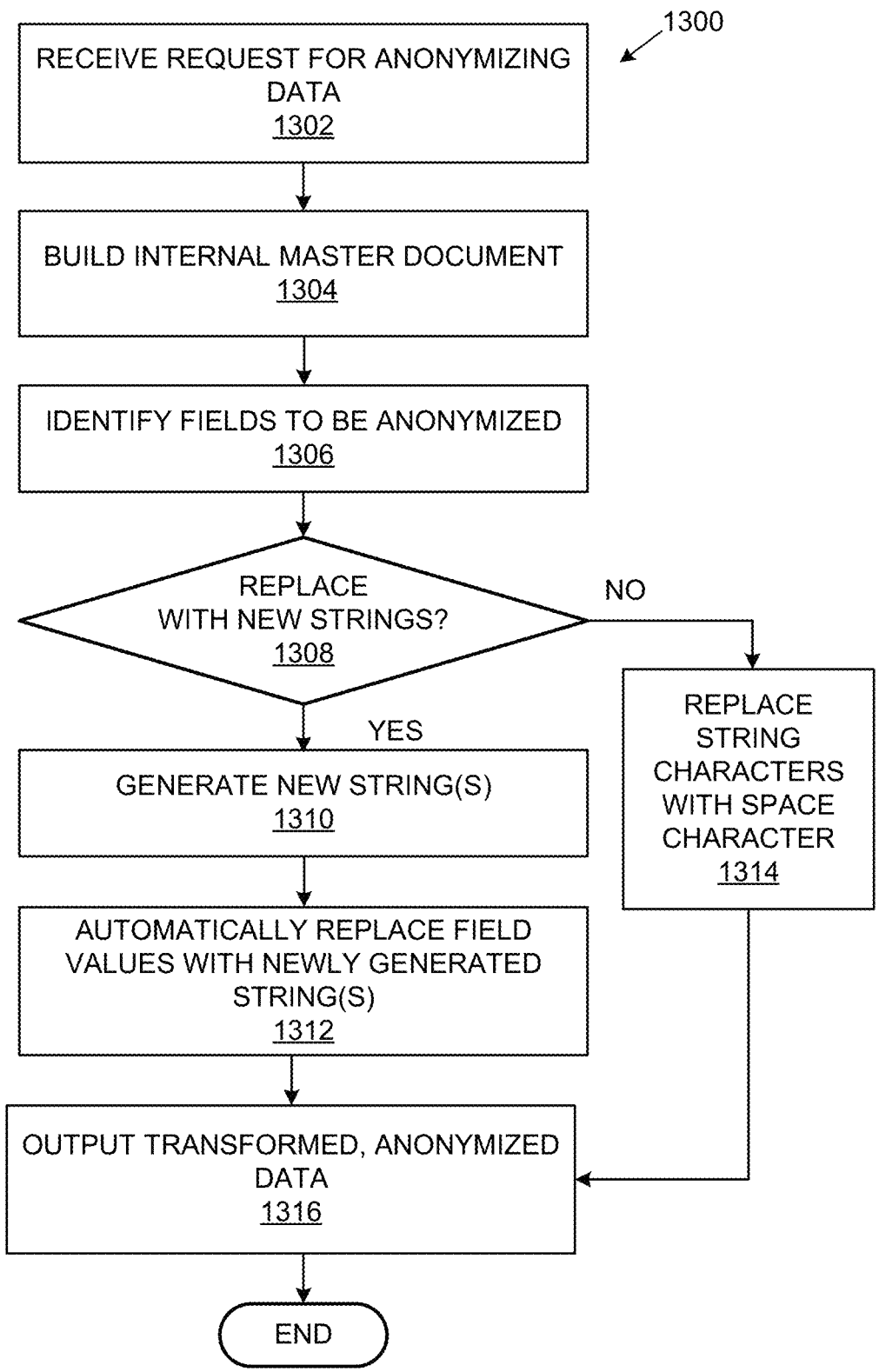
FIG. 13 shows a flowchart that details a process of generating anonymized or pseudonymized patient data in accordance with some examples disclosed herein.

FIG. 13 shows a flowchart 1300 that details a process of generating de-identified patient data in accordance with some examples disclosed herein. Various situations can exist wherein anonymized data is required. For example, a health insurance company may require anonymized data of plan subscribers to be given to a vendor for analysis per the Health Insurance Portability and Accountability Act (HIPAA). HIPAA provides data privacy and security provisions for safeguarding medical information. Generally anonymized data is generated from existing real-world data manually by having a user identify fields to be anonymized and substituting either the substitution strings or blackening/blanking out the entire field. This process is laborious, time consuming, and can be prone to errors.

The process of de-identifying data can begin at 1302 wherein the request 152 is received for anonymizing or pseudonymizing data or for de-identification of data included in the documents 154. Documents 154 may be enclosed within the request 152 or the additional documents 156. The intent 164 can be derived from the request 152. The documents 154/156 are processed in accordance with the examples discussed herein using, for example, the domain model 104. By way of illustration and not limitation, the process rules 322 can identify the fields to be extracted from the documents 154 or 156 for anonymizing or pseudonymizing, the strings (if any) that are to be used in the de-identification, etc. Accordingly, the internal master document 172 that enables the automatic execution of the anonymizing process is built at 1304.

The internal master document 172 can include fields having the name-value pairs as specified by the process rules 322. The fields which are to be anonymized are identified at 1306. The internal master document 172 can be generated in one or more formats, such as a markup based document, a portable data format (.pdf), etc. based on predetermined formats that are compatible with how the automated de-identification process ingests documents. It is determined if the values in the fields are to be replaced with new strings at 1308. In an example, the user can set a flag in the requirements for the anonymizing or pseudonymizing process in order to have new strings generated for the de-identification or anonymizing/pseudonymizing process. If it is determined at 1308 that the values are to be replaced with a new string (YES), then the new string which is to replace the values is generated at 1310. The new string can be automatically generated based on predetermined requirements conveyed, for example, in the request 152 or in the process rules 332.

For example, programming instructions can be used to replace one or more characters or each character in the field's value with another character. In an example, a one-to-one correspondence is not maintained between strings of the original values and the new strings in the anonymized data thereby adding a further layer of anonymity. In an example, each unique field value can be replaced with a respective unique string using random string generation functions available in programming languages. A correspondence between the original data with the field values and the pseudonymized data with the respective unique strings may be maintained via a table or via some other data structure or via metadata if required so that the original data corresponding to the unique strings in the pseudonymized data can be retrieved when necessary. The field name(s) or corresponding values are located at the various portions of the internal master document 172 as specified in the process rules 322 and their values are automatically replaced at 1312 with the new string(s) generated at 1310. In an example, the locations of the fields or field values within the internal master document 172 can be stored in a table of pointers. Upon generating the new string(s) the table of pointers can be accessed to locate the field values within the internal master document 172 for the replacements. Transformed data including a transformed dataset or a transformed document is thus generated and output at 1316 wherein the field values pertaining to the identifying indicia are anonymized or pseudonymized with the new strings generated at 1310.

If it is determined at 1308 that the values in the fields are not to be replaced with new strings, then the values are blanked out. For example, the method moves to 1314 to locate values of each of the fields to be anonymized in the dataset or document and to replace each character in the values with, for example, a space character. In another example, the characters may be blacked out or otherwise redacted. A transformed document is thus generated and output at 1316 wherein the field values pertaining to the identifying indicia are anonymized or replaced with one or more space characters and the method terminates. A de-identification review screen enables a reviewer to supervise or change the de-identification process during execution. For example, if an expected value e.g., the string to be used in replacements etc. is not accessible or other errors occur during the de-identification process, error messages can be generated for the reviewer who can intervene and correct the errors thereby enabling the de-identification process to proceed smoothly. In an example, the transformed document generated and output at 1316 can be displayed to a reviewer for validation. The transformed document/data which has been validated by the reviewer can be employed in downstream processes. The anonymized or pseudonymized data thus generated can be used in the healthcare industry to analyze patient or customer data to obtain statistics without having to share confidential information with the data analysts thereby protecting the privacy of the patients.

Figure 14:
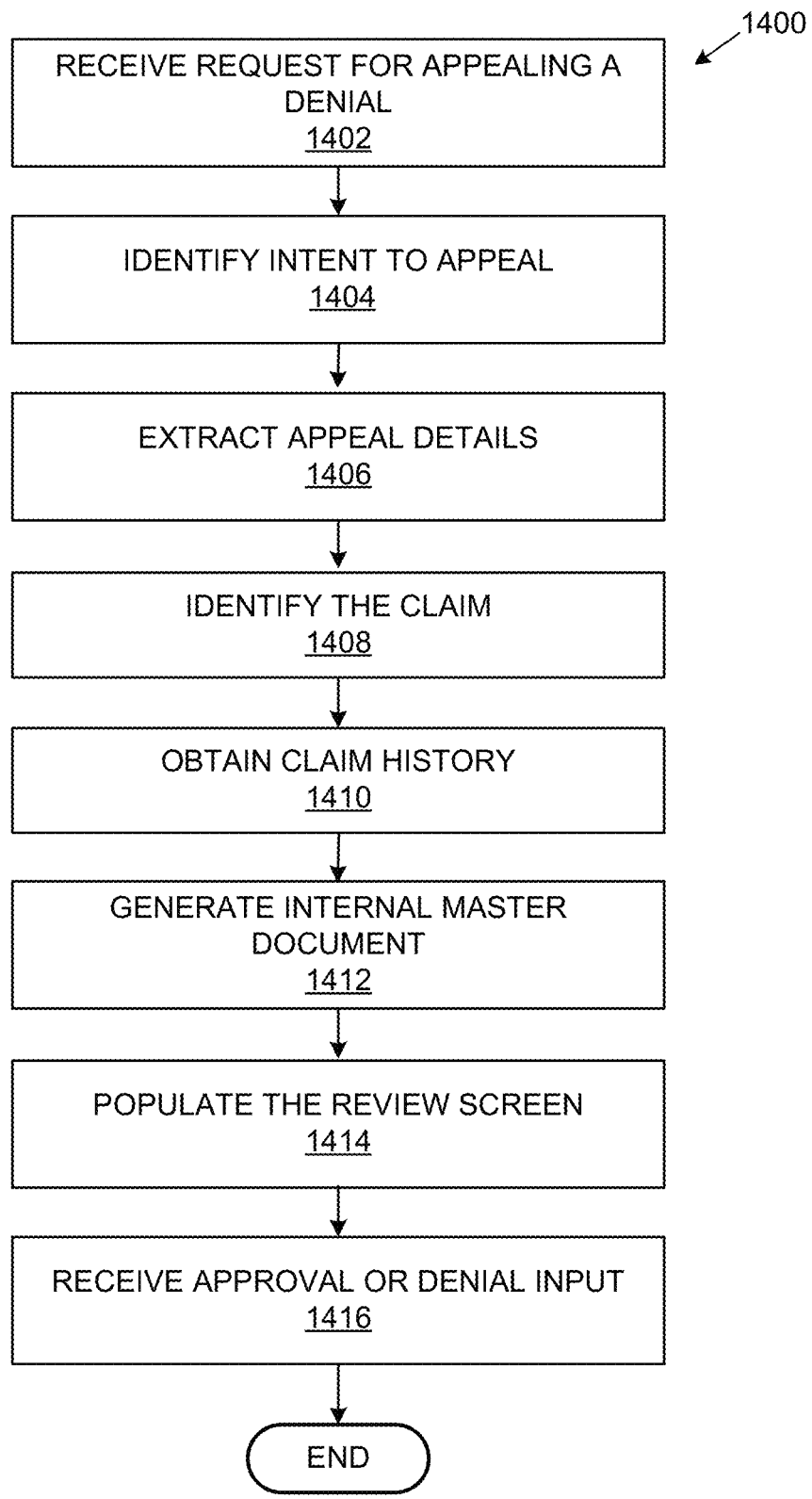
FIG. 14 shows a flowchart that details a method of automatically processing an appeal in accordance with the examples disclosed herein.

FIG. 14 shows a flowchart 1400 that details a method of automatically processing an appeal in accordance with the examples disclosed herein. A provider or a customer whose claim is denied can appeal the denial to the health insurance provider using different forms or documents. The document processing system 100 in this case, extracts the details of the claim, displays the information to a human reviewer for approval or to confirm a denial. The request 152 appealing a payment denial can be received at 1402. The request 152 can include the documents 154 pertaining to the appeal, such as forms, bills presented, reports of the services rendered, claim numbers, prior communications, etc.

An intent is identified at 1404 by analyzing the request 152 and the documents accompanying the request. In this case, determination of the intent 164 can be simplified via identifying a form for appeal which can include an appeal process code from the documents 154 that may be accompanying the request 152. The details of the appeal are extracted at 1406 from the document(s) 154 received with the request 152 using NLP techniques as disclosed herein in conjunction with the appeal domain model. Using the extracted details, the claim related to the appeal is identified at 1408 and the claim history is obtained from the additional documents 156 obtained from the external knowledge bases at 1410 using the identified claim. The claim history can include data such as but not limited to, the subscriber associated with the healthcare plan on which the appeal is being filed, the prior claims made, the details of the healthcare plan, etc.

The internal master document 172 is generated at 1412 by processing the documents 154 in conjunction with the additional documents 156 and other information that may be retrieved from the external knowledge base 108. The internal master document 172 can thus include additional information that was not conveyed in the request 152 or the documents 154 accompanying the request. For example, information such as an appeal number or claim number, the date the claim was made, the date(s) the claim was denied, etc. may be included in the request 152. However, other information such as the provider/customer identification, the identification of the claim, the policy details, etc. that are retrieved from the additional documents 156 and the external knowledge base 108 are also included in the internal master document 172. Data from the internal master document 172 is used to populate an appeal review screen at 1414. In an example, the appeal review screen can be a markup-based document which can provide access to the documents 154/156 in their original formats. The reviewer can approve or confirm denial of the claim based on the information presented in the review screen and an input to this end is received from the reviewer at 1416.

The document processing system 100 can enable generation of a patient profile at pharmacies in accordance with another example. When a prescription is faxed for processing to a pharmacy by a doctor, the document processing system 100 can receive the prescription, identify and classify the information therein using the pharmacy domain model corresponding to the domain model 104. The patient profile can be automatically created from the information available in the prescription or information in an existing profile can be updated with the data from the new prescription. An alert can be generated to the pharmacist regarding a new prescription to be filled and related functions such as printing labels, etc. can be automatically executed.

In an example, the document processing system 100 can be used in validating and reimbursing enrollees in disability or life insurance plans. The procedures can be similar to the reimbursements under healthcare plans as outlined herein. Again, the request 152 for reimbursement can be received via fax or email for reimbursement under a particular plan. The documents 154 from the request and other additional documents 156 are identified based on an intent, the documents 154, 156 can be compared with each other or with information in the external knowledge base 108 which can include one or more of the disability/life insurance plan data and the enrollee information. Any discrepancies between the documents 154, 156 and data from the external knowledge base 108 can be automatically and/or manually resolved using a disability/life insurance domain model (corresponding to the domain model 104) and based on the process rules 322 corresponding to the insurance procedures. The output of the automated procedure can be presented to user who can either approve or disapprove the reimbursement. In an example, the document processing system 100 can also produce a recommendation on whether or not the reimbursement can be approved based on the results of the various categorizations, comparisons, validations, etc. which the user may decide to accept or decline.

Figure 15:
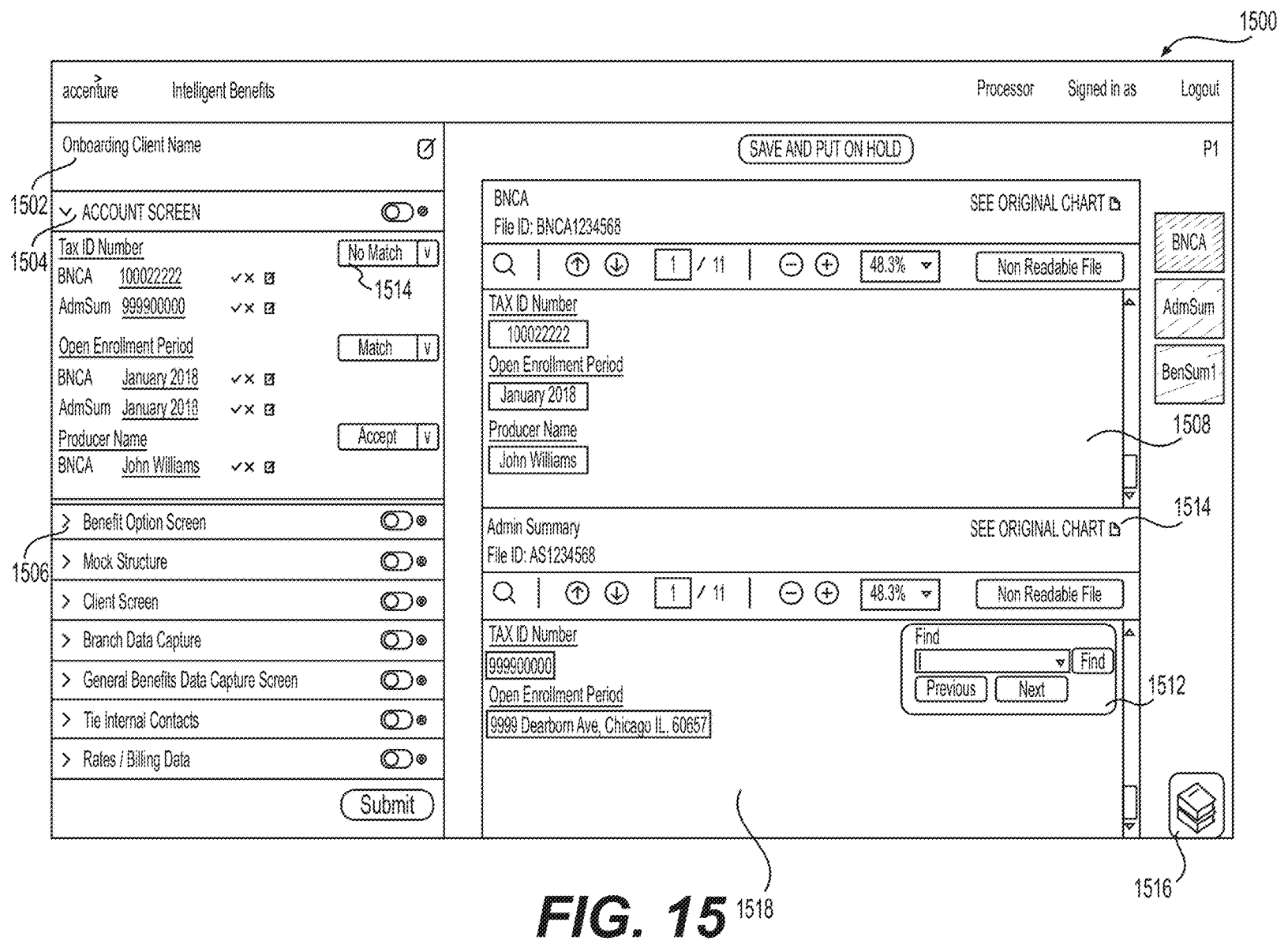

FIG. 15 shows a graphical user interface (GUI) 1500 that enables editing of the information extracted from the request 152. The edited information is displayed within the various panes of the user interface 1500. The pane 1502 includes one or more tabs, such as tabs for account screen 1504 and benefit option screen 1506 which can be expanded to display the extracted information from one or more of the request 152, the documents 154, 156 and the domain model 104. Furthermore, the extracted information can be displayed within the panes 1508, 1518. For example, representations show in panes 1508 and 1518 may mimic the appearance of information in the original documents 154, 156, e.g., the font, the layout and other visual elements of the data from the original documents are maintained in the display. However, unlike the original documents which may be in formats which are non-editable or which cannot be read by machines (e.g., scanned images), the information displayed within the panes 1508 and 1518 is machine-readable and searchable using the find interface 1512 and can be edited by, for example, a user or another device. The 'see original chart' button 1514 can provide access to the original attachment document for example, as an overlay on the UI 1500. Furthermore, example UI widgets such as drop-down box 1514 can be provided to enable users to input explicit feedback such as match or no match i.e., whether one or more of the attached documents and/or the domain model 104 have matching data. User feedback can be employed by the feedback collector 118 to further train one or more of the intent analyzer 106 and the domain model 104 so that when a similar discrepancy is again detected the next time, the document processing system 100 is enabled to handle the discrepancy automatically. In addition, a library or even access to the external knowledge base 108 can be provided via a UI element 1516.

Figure 16:
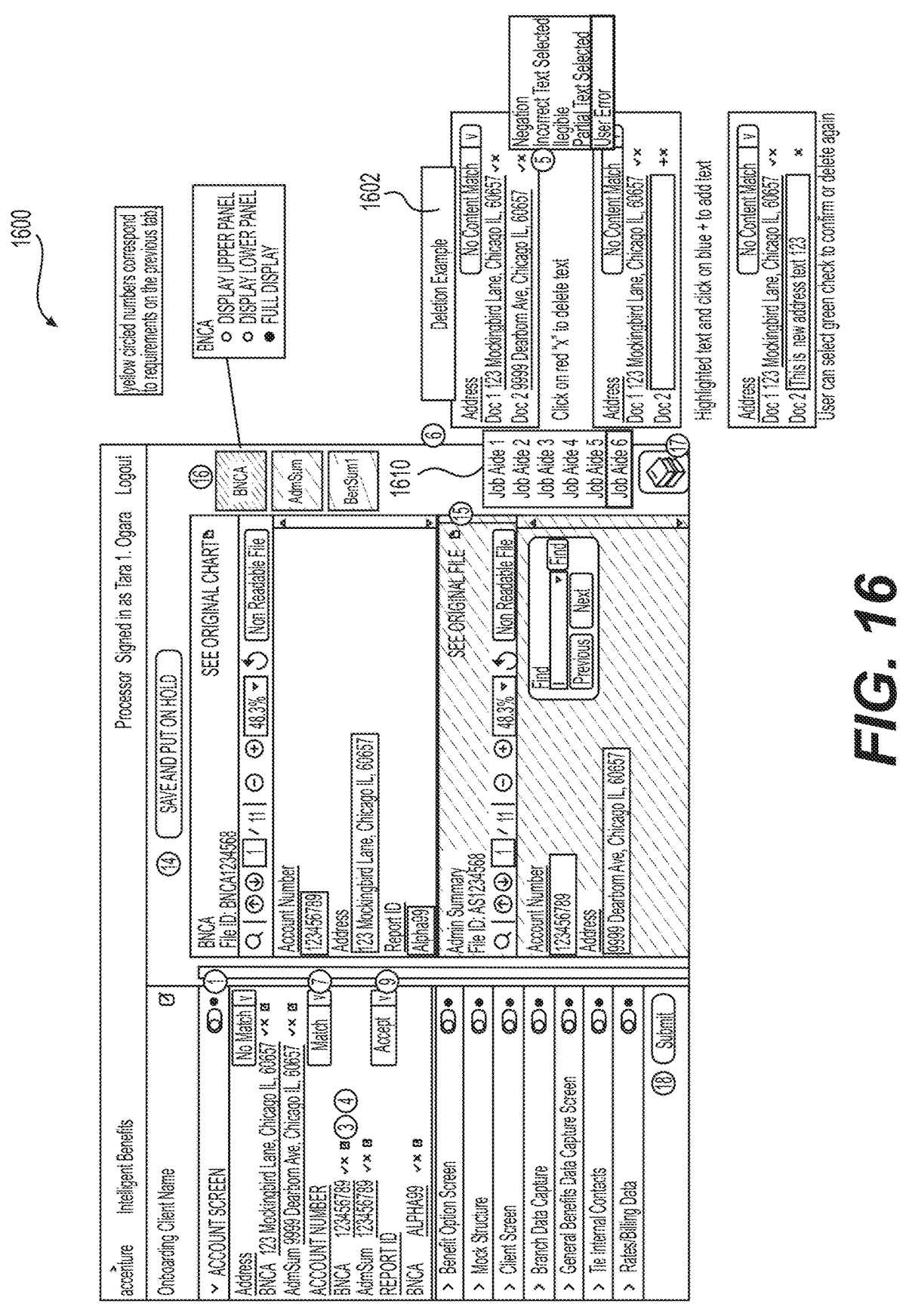

FIG. 16 shows a GUI 1600 that illustrates various user edits that are enabled by the document processing system 100. The UI 1600 shows access to a listing of various jobs 1610 to be processed by the document processing system 100 which may or may not require human review. In addition, UI 1600 shows widgets for the deletion and edit operations as shown at 1602. Various widgets are provided such as for example, a red 'x' to delete the text or a blue '+' to add the text and the like.

Figure 17:
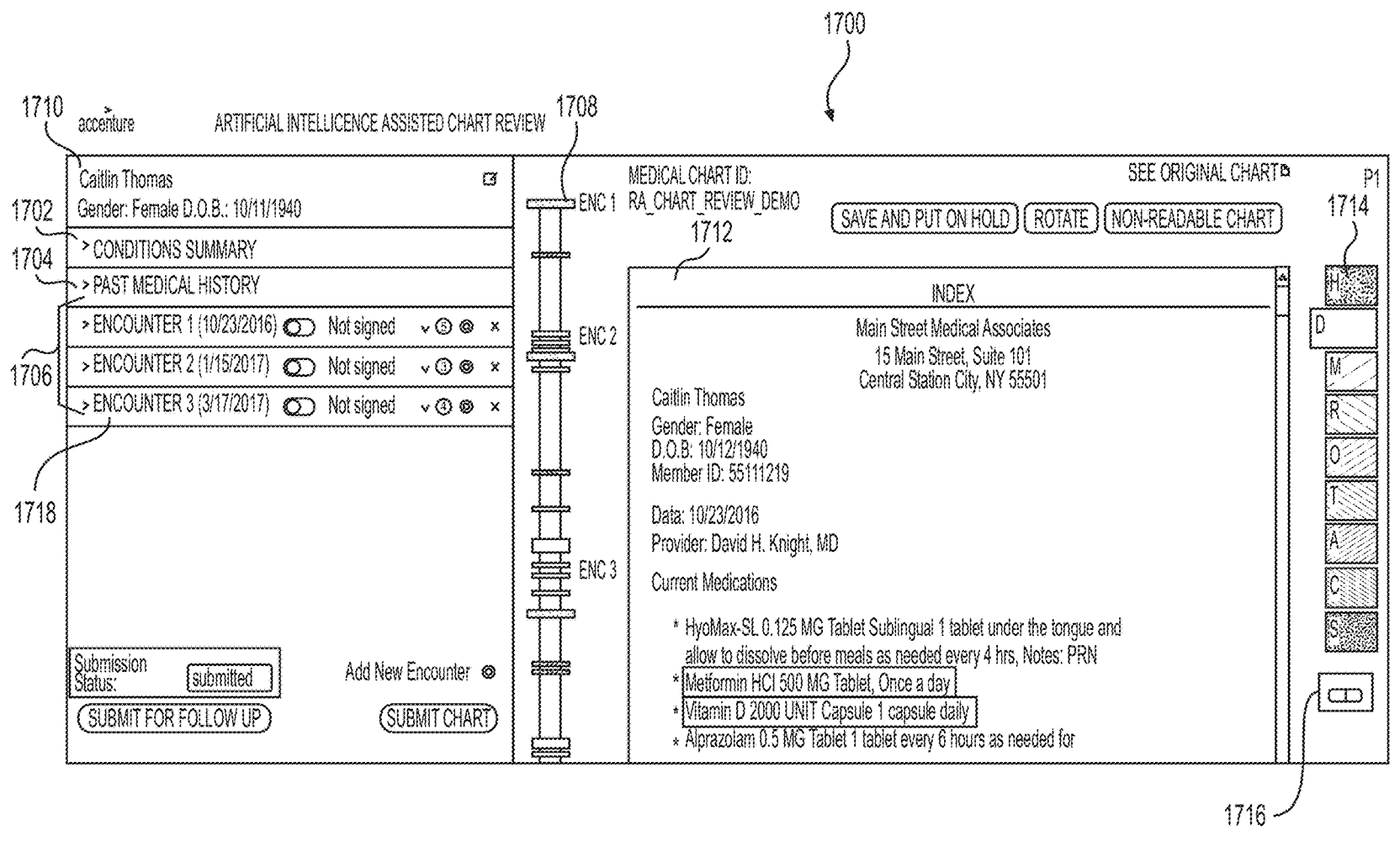

FIG. 17 shows a GUI 1700 including an EHR of a patient that is displayed by the document processing system 100 for review in accordance with some examples disclosed herein. The user interface 1700 can be displayed during the automated medical billing process or risk adjustment process disclosed herein for example. The left hand side (LHS) 1710 of GUI 1700 includes various menu items that can be selected to view/display different parts of the EHR including, a conditions summary 1702, past medical history 1704 and the list of encounters with one or more providers 1706 is presented with each encounter 1718 as a selectable menu item. In addition, a timeline 1708 also displays various encounters. The document processing system 100 is configured to analyze the various documents 154 received with the request 172 and the documents 156 retrieved from external knowledge bases.

The right hand side (RHS) of the GUI 1700 includes a display 1712 of one of the documents generated at various encounters or retrieved during the automatic execution of the process. The display 1712 shows one such document. However, in the case of intelligent benefits, two documents can be displayed side-by-side for comparison purposes. Colored tabs 1714 are included which provide easy user access to various parts of the EHR and further edit the accessed portions of the HER wherein the type of information is associated with each of the tabs. For example, the first tab H stands for medical history, D for diagnosis codes, M for medications, R for test results, O for tests ordered, T for treatment plans, A for assessment summary, C for Chief complaint and S for symptoms. While the arrangement of tabs as shown in FIG. 17 is specific to the risk adjustment process, the tabs may be customized and altered for other processes. It can be appreciated that selecting the tabs can display the information gathered from the various documents of the EHR into the internal master document wherein different portions of the internal master document correspond to a particular tab. A medication search feature 1716 is included which enables access to a drugs database, identifying medication uses and commonly associated diagnoses for a given medication.

Figure 18:
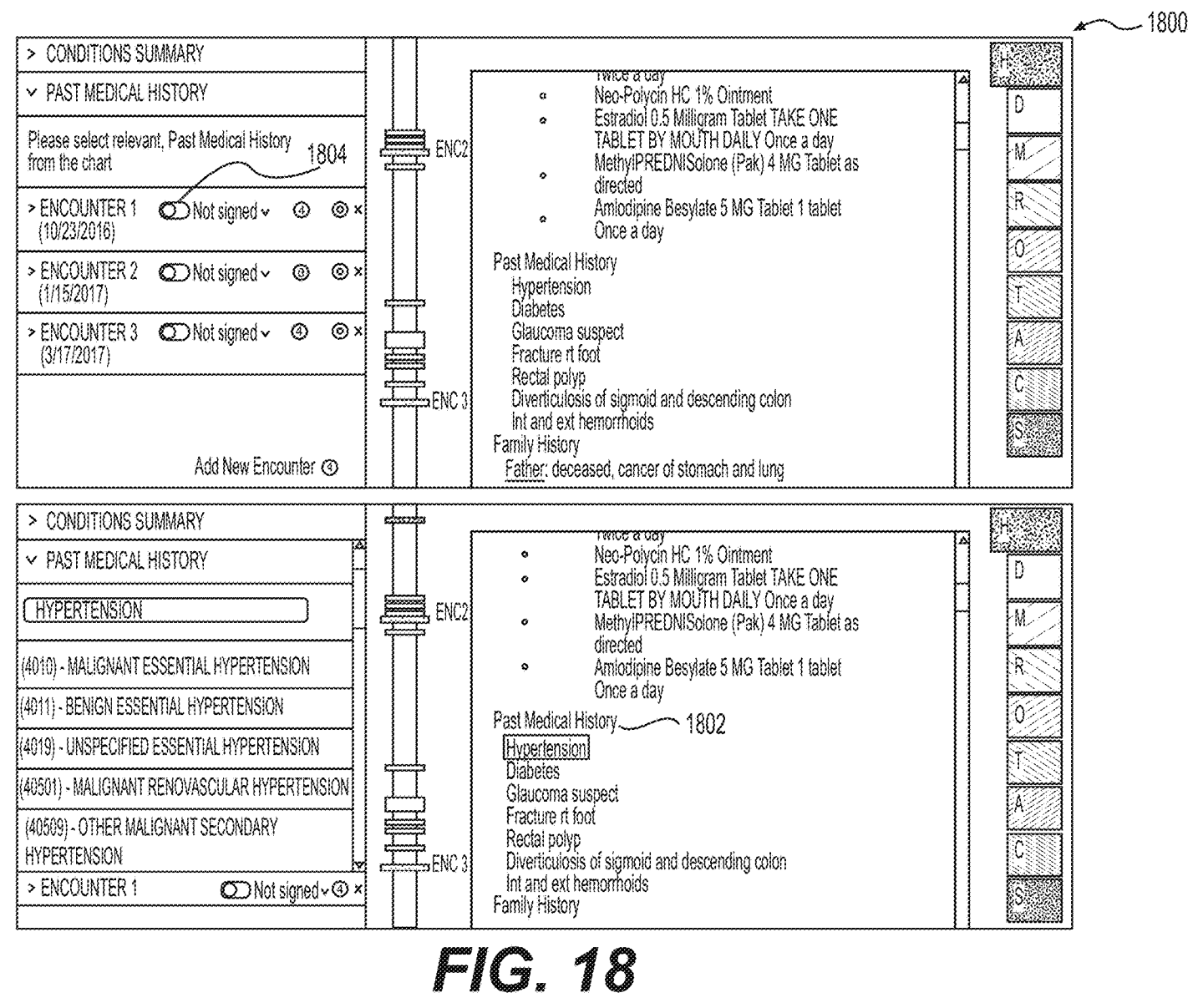

FIG. 18 shows a GUI 1800 the portion of the EHR or the internal master document 172 that is displayed when the H tab corresponding to the medical history is selected. The various medical conditions included in the past medical history are displayed at 1802. Similarly, selection of other tabs can show other portions of the internal master document. As each portion of the internal master document 172 is validated by a user via review on the RHS, the user can sign off on that portion which is indicated by a switch 1804 that toggles between a 'not signed' and a 'signed' status.

FIG. 19 shows a GUI 1900 that enables a user to sign off on a portion of the EHR such as the selectable encounter 1918 in accordance with the examples disclosed herein. For example, the first identified encounter can be selected by the user on the LHS and the information therein reviewed on the RHS as shown in the GUI 1600. The switch is initially in a 'not signed' state 1902 and upon review of the portion, the user can select a 'signed' state from a dropdown box which can cause the switch to flip to a signed state 1904. Fields such as but not limited to diagnosis codes, supporting documentation, encounter dates, etc. can be verified by the user during the review process. In case the user decides not to sign the portion, the user can select one or more reasons from the list 1952 and press the 'submit for follow up' button 1954 as shown at 1950.

Figure 20A:
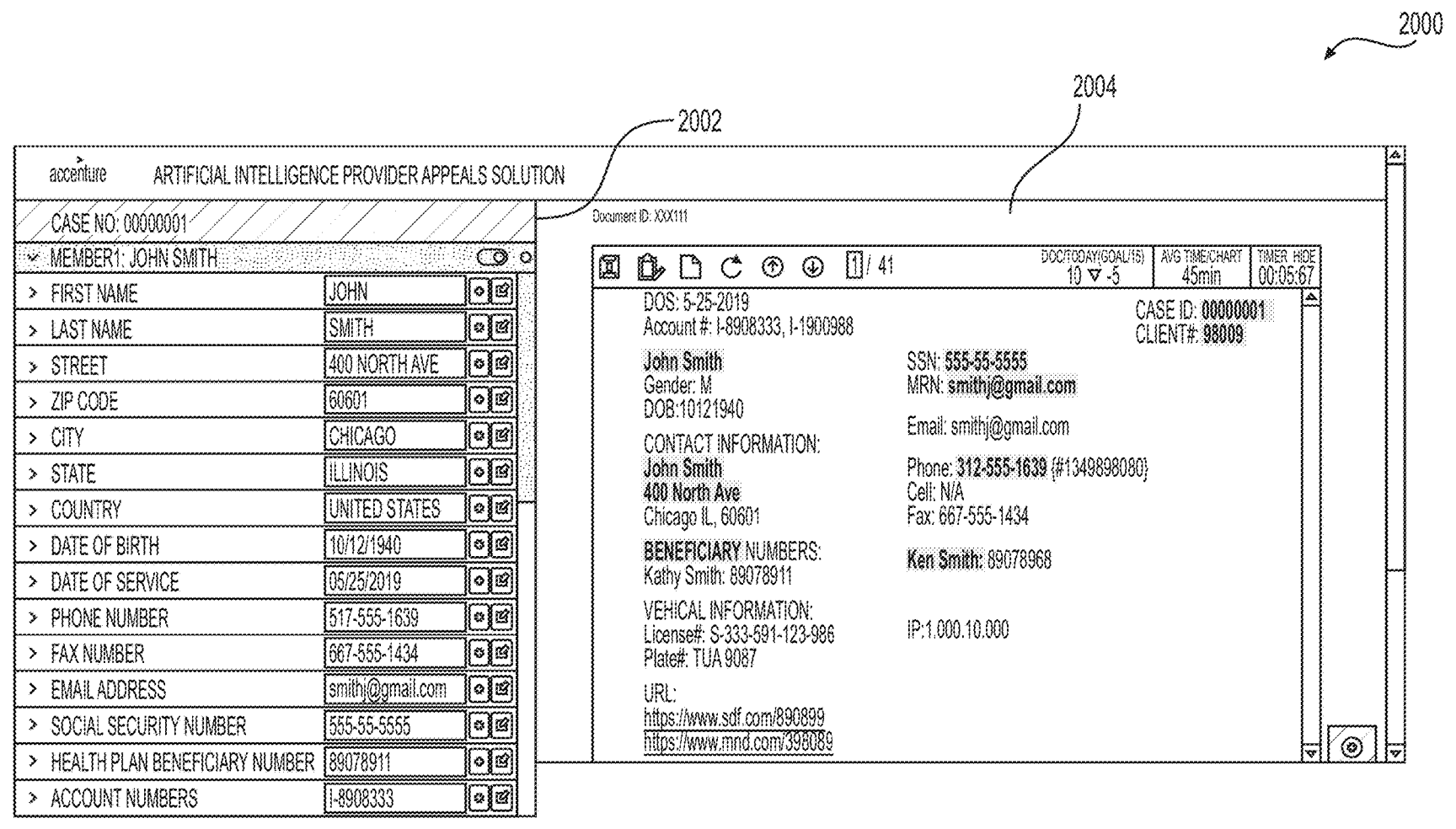

FIG. 20A shows a GUI including the de-identification review screen 2000 that enables anonymizing a member's details in accordance with the examples disclosed herein. The de-identification review screen 2000 includes member details on the LHS 2002, one or more of which are to be anonymized or pseudonymized. In an example, the member details on the LHS 2002 can be populated from the internal master document 172. The member details can include identifying indicia such as the first and last names, social security numbers, address, date of birth, date of service, member contact information such as phone, fax, email address, etc. insurance details such as health plan number, member id, etc. one or more of which can be anonymized from the document displayed on the RHS 2004 of the de-identification review screen 2000. The RHS 2004 of the de-identification review screen 2000 includes a view of the original copies of the documents 154/156 which are used to generate the internal master document 172. The result from the de-identification process can be obtained in different formats. One format for the de-identification process results can include a dataset with the original field values replaced by new strings in spreadsheet, textual data or comma separated file formats, etc.

Figure 20B:
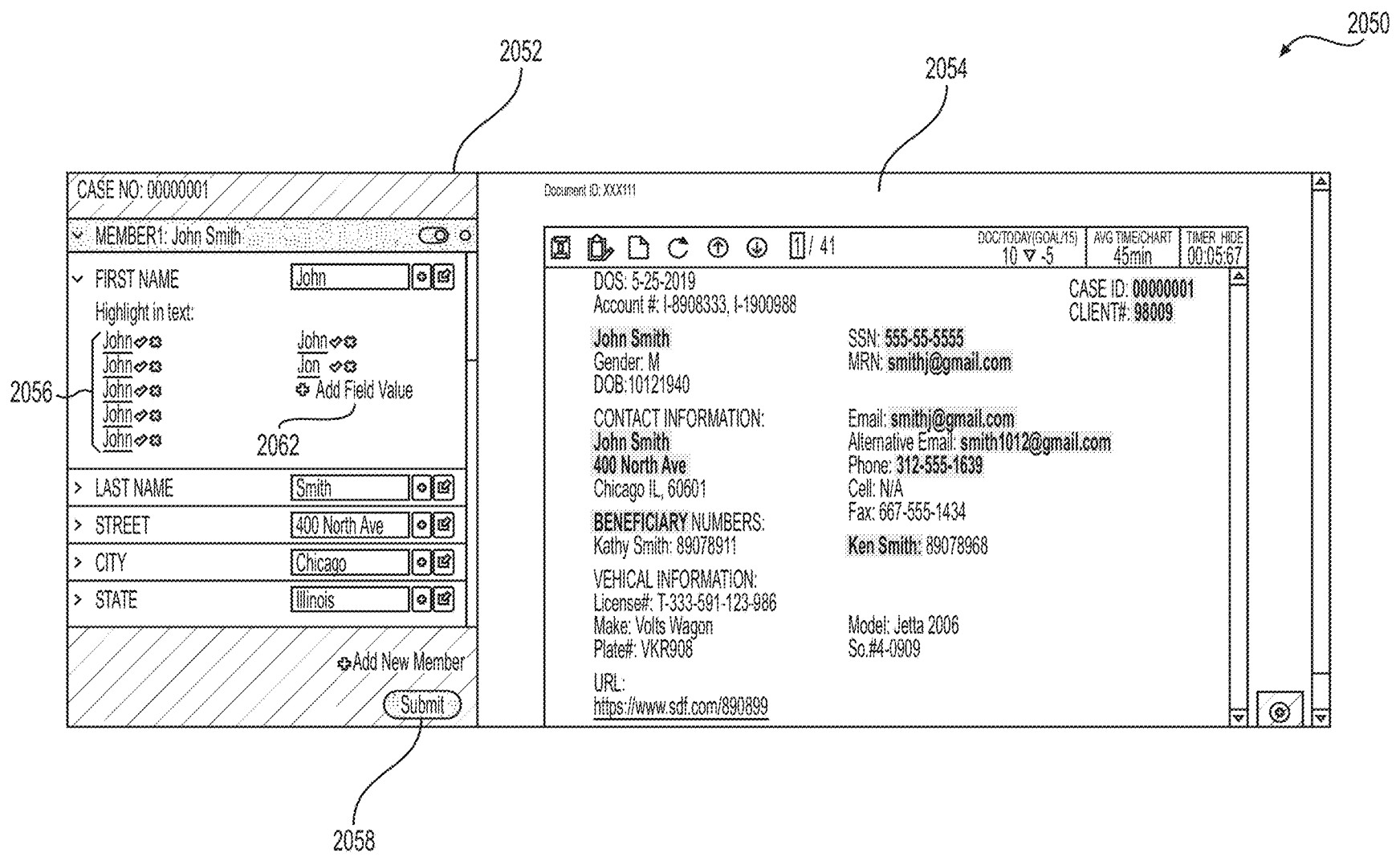

FIG. 20B shows a GUI 2050 wherein details of each of the fields to be anonymized or pseudonymized are shown in accordance with the examples disclosed herein. The details shown in the LHS 2052 of the GUI 2050 show the various instances 2056 of a particular field, e.g., the first name field that occur within the internal master document 172. The user may select one or more instances 2056 from the LHS 2052 for manual de-identification or the user can click the submit button 2058 for anonymizing all the instances 2056 of the particular field values. In an example, the selection of one of the list of field values 2056 in the LHS 2052 can cause the view on the RHS 2054 to scroll to a portion of the internal master document 172 that includes that particular field value. When the field values are identified from each of the documents 154/156 that make up the internal master document 172, a pointer to the location of each of the field values can be stored by the document processing system 100.

The selection of a particular field value can cause retrieval of the corresponding location as indicated by the pointer thereby causing the view to be scrolled accordingly to the corresponding location. In fact, if any field values from the documents 154/156 are not identified in the automatic document processing procedures, the reviewer can manually add the field value by using the 'add field value' 2062 button. Upon clicking the add field value button 2062, the field value is added to the list of field values 2056 and the location of the particular field value within the original document is stored in the table so that when the added field value is selected, the view in the RHS 2054 automatically scrolls to the location of that particular field value within the original documents 154/156. The results of the de-identification process may also be produced as a transformed document e.g., the document formatted in a manner similar to the original documents 154/156 but the field values blanked out using for example, the space characters to replace the string characters or the field values replace with the new strings. The RHS 2004 shows or highlights the various fields that are specified on the LHS 2002 for anonymization.

Figure 21A:
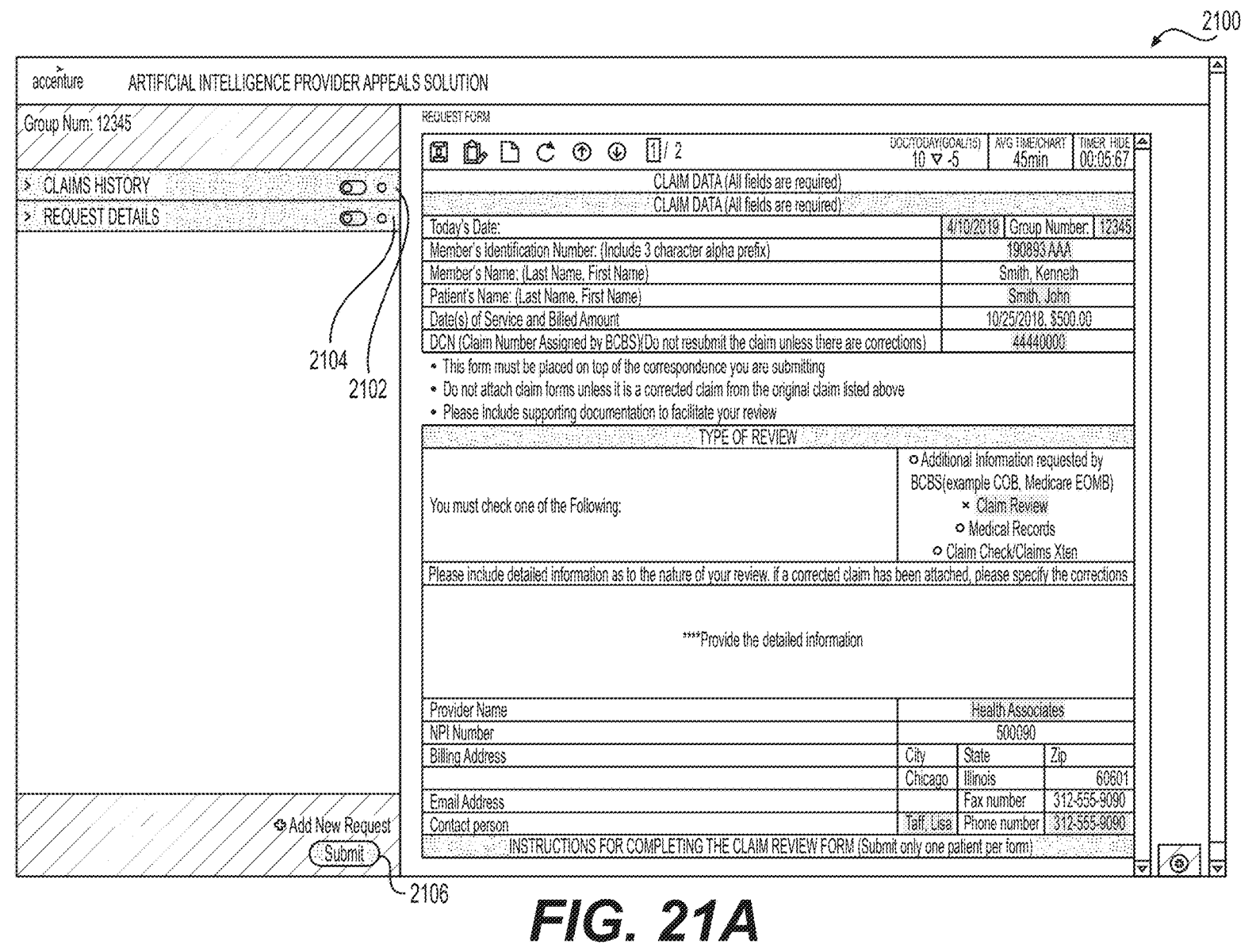

FIG. 21A shows a GUI including a review screen 2100 for automatically analyzing and validating a provider's appeal in accordance with the examples disclosed herein. The review screen 2100 can include two portions, such as a claims history 2102 and a request details 2104. The request details 2104 can be extracted from the documents 154 accompanying the request 152. The claims history 2102 can be extracted from the additional documents 156 and the external knowledge base 108 based on the information extracted from the request details 2104. The reviewer upon examining the claims history 2102 and the appeal details as extracted and presented on the review screen 2100 can approve or reject the appeal via pressing the submit button 2106.

Figure 21B:
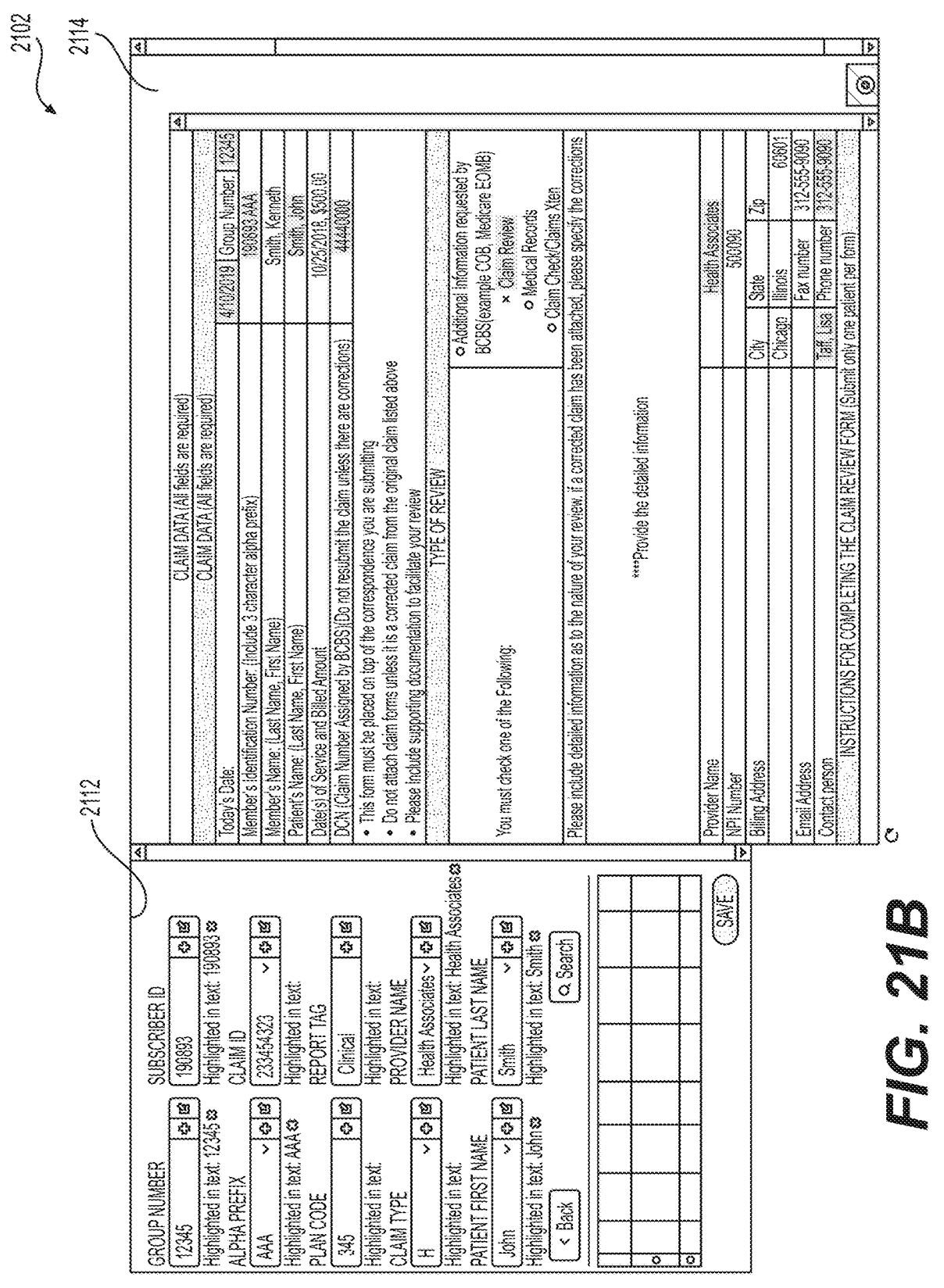

FIG. 21B shows the claims history 2102 extracted in accordance with the examples disclosed herein. The claims history 2102 can relate to the historical details of a claim denied in whole or in part and/or subscriber/provider associated with a particular appeal. The LHS 2112 of the claim history 2102 includes a user interface with UI elements such as the text boxes with group number, subscriber id, alpha prefix, etc. populated with the data extracted from the additional documents 156 and/or the external knowledge base 108 and populated by the internal master document 172. The RHS 2114 shows a portion of the original documents 154/156 or files from the external knowledge base 108 used to extract the information shown in the UI on the LHS 2112.

Figure 21C:
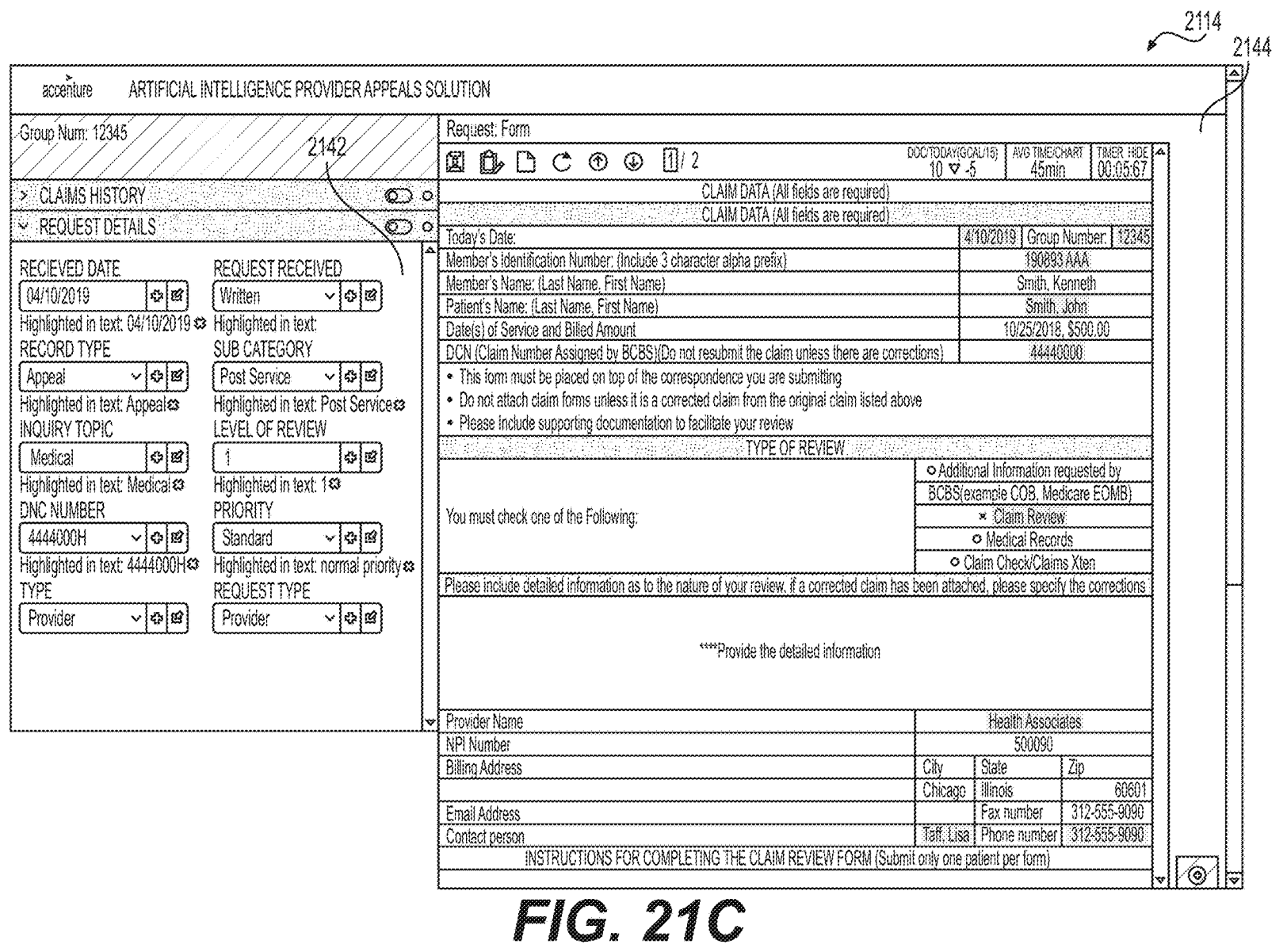

FIG. 21C shows the request details 2104 extracted in accordance with the examples disclosed herein. The request details 2104 pertain to details regarding the appeal or the request 152 such as but not limited to received date, record type, the form in which the request for received, the level of review, priority, etc. Again, LHS 2142 of the request details 2114 includes a user interface with UI elements such as the text boxes with group number, subscriber id, alpha prefix, etc. populated with the data extracted from the additional documents 156 and/or the external knowledge base 108. The RHS 2144 shows a portion of the original documents 154/156 or files from the external knowledge base 108 used to extract the information shown in the UI on the LHS 2142. It can be appreciated that FIGS. 15-21C are example GUIs and that other GUIs which differ by displaying information in different locations on the interface, using different identifiers for representing information, different icons, tables, layouts, etc. can also be implemented by the data processing system 100 in accordance with the example disclosed herein.

Figure 22:
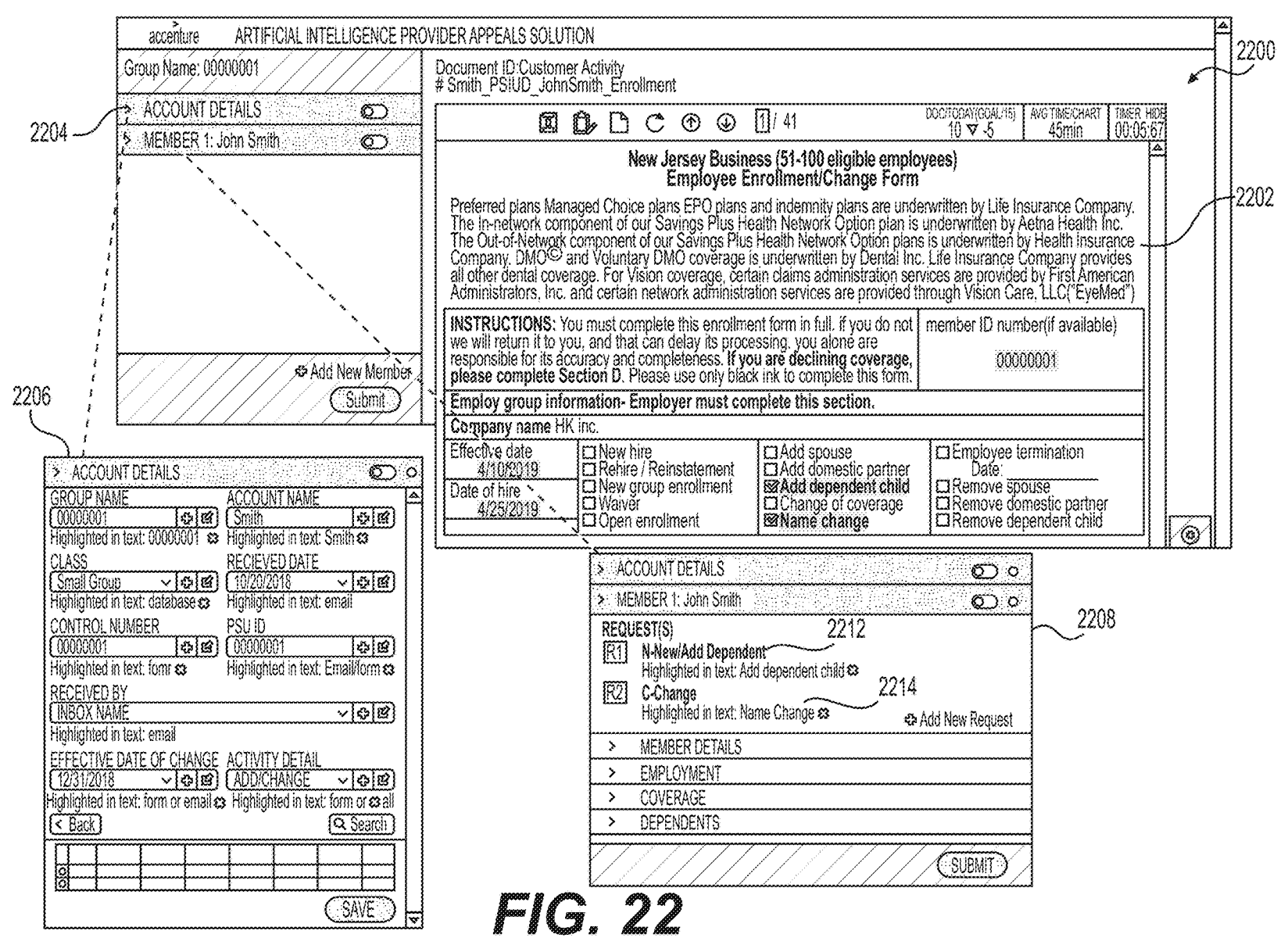

FIG. 22 shows an enrollment user interface 2200 associated with enrolling new members and/or renewing health benefits for existing members. The document 2202 can include the information of a member/members to be enrolled and may be one of the documents 154 received in the request 152. The member details are automatically extracted by the document processing system 100 as detailed herein and can be seen by selecting the account details 2204 tab. When selected, the account details tab 2204 expands to show the details 2206 of the member 'John Smith'. When the member tab 2208 is selected, the member tab 2208 expands to show that various additional functionalities are enabled as shown at the expanded portion 2210. For example, the 'new/add dependent' button 2212 enables adding new dependents while the 'change' button 2214 enables changing the member details e.g., the name change etc.

Figure 23:
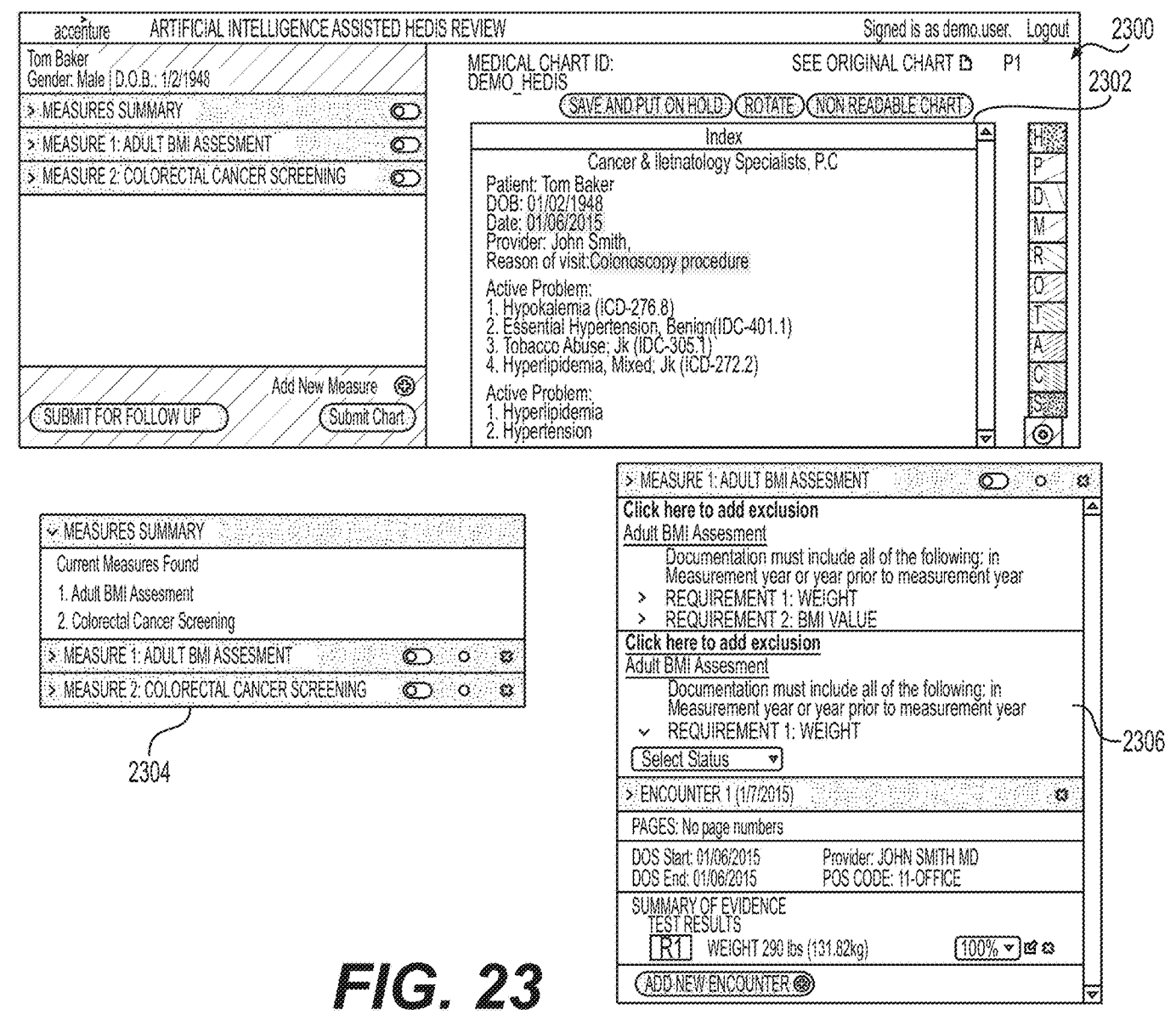

FIG. 23 shows a user interface 2300 pertaining to the evaluation of a healthcare plan under HEDIS. The request 152 can include one or more documents related to the healthcare plan and/or additional documents 154 related to the healthcare plan as shown at 2302 can be retrieved from the external knowledge base 108 based on the intent 164 derived from the request 152. The details of the various measures found are shown at 2304 and 2306.

FIG. 24 shows user interfaces 2402, 2404 and 2406 pertaining to the utilization management processes wherein a plan enrollee makes a claim for payment which is processed in accordance with the examples disclosed herein by the document processing system 100. The user interface 2402 shows the supporting medical policies and requirements, the user interface 2404 shows the member details including the plan details which enables the document processing system 100 to determine whether the claim is valid or invalid while the user interface 2406 shows the authorization details regarding the personnel how can authorize payment of the claims as well as certain payment claim attributes such as the urgency status 2408, the procedure codes 2410, etc.

Figure 25:
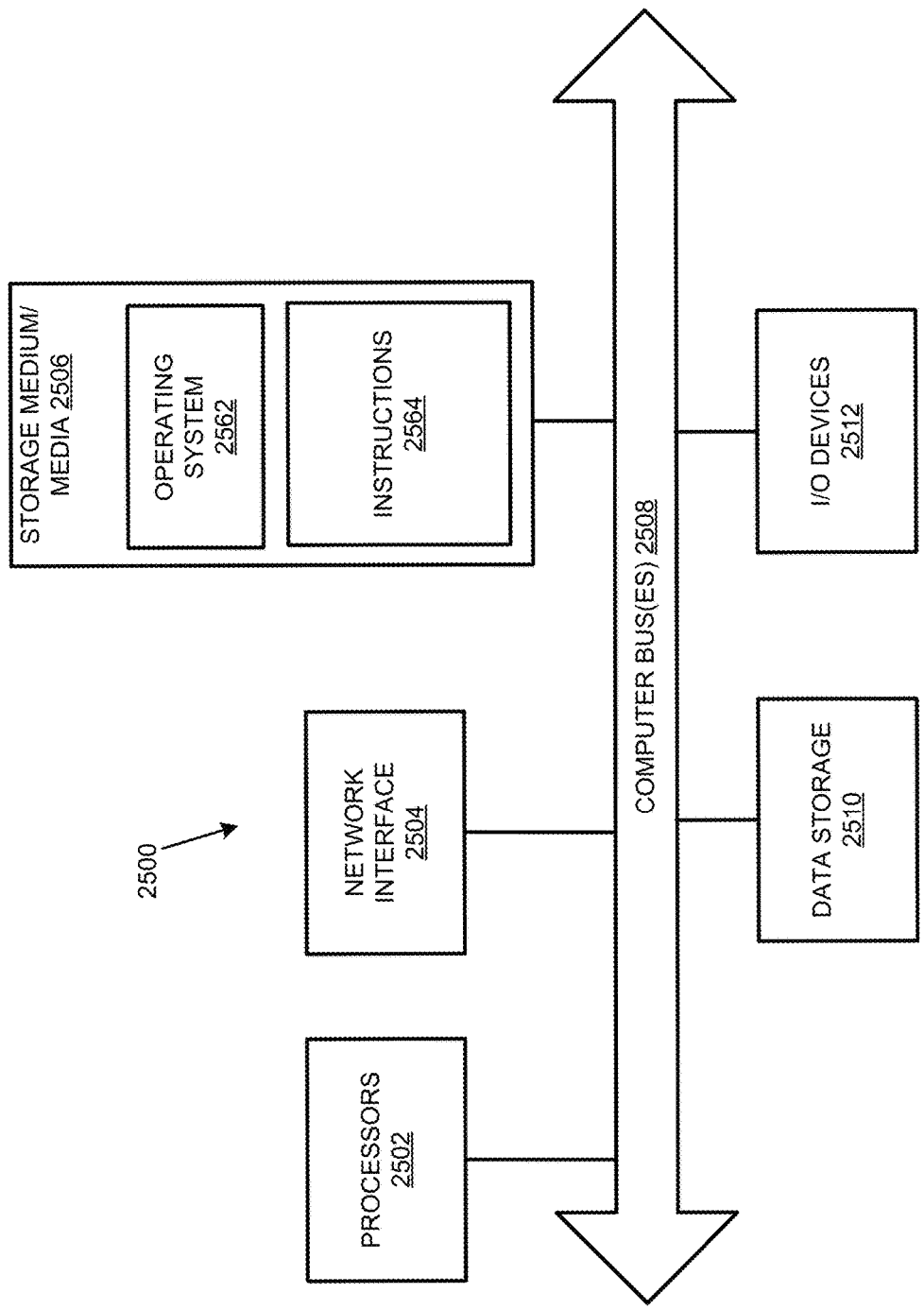
FIG. 25 illustrates a computer system that may be used to implement the document processing system in accordance with examples described herein.

FIG. 25 illustrates a computer system 2500 that may be used to implement the document processing system 100. More particularly, computing machines such as desktops, laptops, smartphones, tablets, wearables which may be used to generate or access the non-editable files corresponding to unstructured documents and their component documents may have the structure of the computer system 2500. The computer system 2500 may include additional components not shown and that some of the components described may be removed and/or modified. In another example, the computer system 2500 can be implemented on external-cloud platforms such as, but not limited to, Amazon Web Services, AZURE® cloud or internal corporate cloud computing clusters, or organizational computing resources, etc.

The computer system 2500 includes processor(s) 2502, such as a central processing unit, ASIC or other type of processing circuit, input/output devices 2512, such as a display, mouse keyboard, etc., a network interface 2504, such as a Local Area Network (LAN), a wireless 802.11x LAN, a 3G, 4G or 5G, a mobile WAN or a WiMax WAN, and a computer readable storage medium 2506. Each of these components may be operatively coupled to a bus 2508. The computer readable storage medium 2506 may be any suitable medium which participates in providing instructions to the processor(s) 2502 for execution. For example, the computer readable storage medium 2506 may be non-transitory or non-volatile medium, such as a magnetic disk or solid-state non-volatile memory or volatile medium such as RAM. The instructions or modules stored on the computer readable medium 2506 may include machine readable instructions 2564 executed by the processor(s) 2502 to perform the methods and functions of the document processing system 100.

The document processing system 100 may be implemented as software stored on a non-transitory computer readable medium with processor-executable instructions executed by one or more processors. For example, the computer readable medium 2506 may store an operating system 2562, such as MAC OS, MS WINDOWS, UNIX, or LINUX, and code or machine readable instructions 2564 for the document processing system 100. The operating system 2562 may be a multi-user, multiprocessing, multitasking, multithreading, real-time and the like. For example, during runtime, the operating system 2562 is running and the code for the document processing system 100 is executed by the processor(s) 2502.

The computer system 2500 may include a data storage 2510, which may include non-volatile data storage. The data storage 2510 stores any data used by the document processing system 100. The data storage 2510 may be used to store real-time data associated with the processes executed by the document processing system 100 such as the received requests, the various jobs to be executed, the selected documents, extracted fields, the internal master document that are generated and the like.

The network interface 2504 connects the computer system 2500 to internal systems for example, via a LAN. Also, the network interface 2504 may connect the computer system 2500 to the Internet. For example, the computer system 2500 may connect to web browsers and other external applications and systems via the network interface 2504.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A document processing system, the system comprising:
one or more processors; and
a non-transitory data storage comprising processor-executable instructions that, when executed, cause the one or more processors to:
  receive a request,
    the request comprising information related to a de-identification process,
    the de-identification process to be automatically executed,
    the de-identification process to one of automatically anonymize and automatically pseudonymize identifying indicia of one or more subscribers,
    the one or more subscribers identified using subscriber information, and
    the subscriber information and the identifying indicia of the one or more subscribers are retrieved from a dataset;
  extract the information,
    the extracted information used to facilitate automatic execution of the de-identification process,
    the extracted information being from at least two documents, the at least two documents:
- having different formats, and
- being associated with the de-identification process, and
- the extracted information being extracted based on a domain model;

identify an intent associated with the information,
- the intent used for identifying the de-identification process, and
- the intent being determined based on:
  - a textual processing technique, and
  - a natural language processing (NLP) technique;

obtain one or more required fields,
- the one or more required fields to be anonymized during the de-identification process;

build an internal master document based on validating the one or more required fields,
- the internal master document enabling automatic execution of the de-identification process;

identify fields pertaining to the identifying indicia to be anonymized;

locate values of the fields within the internal master document; and generate transformed data by replacing the values of the fields within the internal master document with one or more of a new string and one or more space characters.

2. The document processing system of claim 1, the processor-executable instructions for identifying the fields pertaining to the identifying indicia to be anonymized include instructions that, when executed, cause the processor to:
identify the fields to be deidentified based on one or more of the documents that are enclosed with the request.

3. The document processing system of claim 1, the processor-executable instructions to generate the transformed data include instructions that, that when executed, cause the processor to:
automatically generate the new string based on requirements conveyed in the request.

4. The document processing system of claim 1, the processor-executable instructions to generate the transformed data include instructions that, when executed, cause the processor to:
replace the values of the fields within the internal master document with one or more of the space characters.

5. The document processing system of claim 1, the processor-executable instructions to generate the transformed data include instructions that, when executed, cause the processor to:
generate a data set including the transformed data in one or more of a plurality of formats.

6. The document processing system of claim 1, the processor-executable instructions for extracting the information from the request include instructions that, when executed, cause the processor to:
parse and tokenize textual content of the request; and
extract at least one document pertaining to the de-identification process from one or more of the request and an external knowledge base.

7. The document processing system of claim 6, the processor-executable instructions for extracting the information from the request include instructions that, when executed, cause the processor to:
extract the documents from the external knowledge base based on the intent.

8. The document processing system of claim 7, the processor-executable instructions for extracting the documents comprise instructions that, when executed, cause the processor to:
employ trained document classifiers for the extraction of the documents from the external knowledge base.

9. The document processing system of claim 7, the processor-executable instructions for identifying an intent comprise instructions that, when executed, cause the processor to:
compare the information from the request with domain-specific terminology included in the domain model, wherein the domain model is customized to the process.

10. The document processing system of claim 1, wherein the domain model includes the required fields to be employed in the process, domain-specific terminology, definitions of the fields and types of the fields.

11. The document processing system of claim 1, wherein instructions for building the internal master document comprise instructions that, when executed, cause the processor to:
concatenate the required fields extracted from the at least two documents wherein the required fields include one or more name-value pairs.

12. The document processing system of claim 1, wherein instructions for building the internal master document comprise instructions that, when executed, cause the processor to:
determine a format of the internal master document based on the de-identification process to be automatically executed.

13. The document processing system of claim 1, comprising further instructions that, when executed, cause the processor to:
enable display of the required fields from the internal master document in one or more output graphical user interfaces (GUIs) in user-editable formats.

14. A document processing method comprising:
receiving a request including an intent,
- the intent pertaining to an automated execution of an appeal task,
- the appeal task related to a claim denial, and
- the request including at least one document required for the automated execution of the appeal task;

determining the intent of the request by:
- parsing and tokenizing the request and the at least one document the tokenizing producing a plurality of tokens;
- identifying from the plurality of tokens, data indicative of the intent for the automated execution of the appeal task;

obtaining additional claim history information,
- the additional claim history information required for the automated execution of the appeal task,
- the additional claim history being obtained from an external knowledge base using an appeal domain model, and
- the appeal domain model including terms related to one or more of the claim and a subscriber related to the claim;

identifying the claim related to the appeal;
generating an internal master document that collates information relevant to the appeal task the information relevant to the appeal task including:
        details of the appeal from the document
        the domain model, and
        the external knowledge base;
    populate a review screen with information from the internal master document; and
    receive input approving or rejecting the appeal,
        the input received based on the information from the internal master document populating the review screen.

15. The method of claim 14, wherein generating the internal master document further comprises:
    generating the internal master document as a text file including information collated from the request and the additional claim history.

16. The method of claim 14, wherein populating the review screen further comprises:
    providing, via the review screen, portions of the internal master document for user review.

17. The method of claim 16, further comprising:
    providing the portions of the internal master document for the user review and approval by providing, a respective switch for each of the portions, wherein a state of the switch is automatically toggled upon the approval of the portion by the user.

18. The method of claim 14, wherein the appeal domain model is based on neural networks.

19. A non-transitory storage medium comprising machine-readable instructions that cause at least one processor to:
    receive a request,
        the request comprising information related to a de-identification process,
        the de-identification process to be automatically executed,
        the de-identification process to one of automatically anonymize and automatically pseudonymize identifying indicia of one or more subscribers,
        the one or more subscribers identified using subscriber information, and
        the subscriber information and the identifying indicia of the one or more subscribers are retrieved from a dataset;
    extract the information,
        the extracted information used to facilitate automatic execution of the de-identification process,
        the extracted information being from at least two documents,
        the at least two documents:
            having different formats, and
            being associated with the de-identification process, and
        the extracted information being extracted based on a domain model;
    identify an intent associated with the information,
        the intent used for identifying the de-identification process, and
        the intent being determined based on:
            a textual processing technique, and
            a natural language processing (NLP) technique;
    obtain one or more required fields
        the one or more required fields to be anonymized during the de-identification process;
    build an internal master document based on validating the one or more required fields,
        the internal master document enabling automatic execution of the de-identification process;
    identify fields pertaining to the identifying indicia to be deidentified;
    locate values of the fields within the internal master document; and
    generate transformed data by replacing the values of the fields within the internal master document with one or more of a new string and one or more space characters.

20. The non-transitory storage medium of claim 19, comprising further instructions that cause at least one processor to:
    store, within a table, locations of field values in the documents; and
    enable scrolling to a location of one of the field values within the documents upon selection of an instance of the field value on a portion of a de-identification review screen.

* * * * *